United States Patent [19]

Friedmann

[11] Patent Number: 5,293,977
[45] Date of Patent: * Mar. 15, 1994

[54] APPARATUS FOR TRANSMITTING TORQUE BETWEEN THE ENGINE AND THE TRANSMISSION OF A MOTOR VEHICLE

[75] Inventor: Oswald Friedmann, Lichtenau, Fed. Rep. of Germany

[73] Assignee: Luk Lamellen und Kupplungsbau GmbH, Bühl, Fed. Rep. of Germany

[*] Notice: The portion of the term of this patent subsequent to Sep. 29, 2009 has been disclaimed.

[21] Appl. No.: 942,435

[22] Filed: Sep. 9, 1992

Related U.S. Application Data

[62] Division of Ser. No. 708,930, May 31, 1991, Pat. No. 5,150,777.

[30] Foreign Application Priority Data

| May 31, 1990 | [DE] | Fed. Rep. of Germany | 4017519 |
| Jun. 29, 1990 | [DE] | Fed. Rep. of Germany | 4020759 |
| Aug. 31, 1990 | [DE] | Fed. Rep. of Germany | 4027542 |
| Aug. 31, 1990 | [DE] | Fed. Rep. of Germany | 4027593 |
| Aug. 31, 1990 | [DE] | Fed. Rep. of Germany | 4027614 |
| Aug. 31, 1990 | [DE] | Fed. Rep. of Germany | 4027629 |
| Dec. 24, 1990 | [DE] | Fed. Rep. of Germany | 4041709 |
| Dec. 24, 1990 | [DE] | Fed. Rep. of Germany | 4041722 |

[51] Int. Cl.$^5$ ............................................. F16F 15/12
[52] U.S. Cl. ........................... 192/70.17; 192/106.2; 74/574; 464/68
[58] Field of Search .......... 192/70.17, 106.2, 70.12; 74/574; 464/68

[56] References Cited

U.S. PATENT DOCUMENTS

| 4,856,636 | 8/1989 | Meinhard | 192/70.17 |
| 5,042,632 | 8/1991 | Jäckel | 74/574 X |
| 5,150,777 | 9/1992 | Friedmann | 192/70.17 |
| 5,156,249 | 10/1992 | Friedmann | 192/106.2 |
| 5,160,007 | 11/1992 | Reik et al. | 192/70.17 |
| 5,194,044 | 3/1993 | Jäckel et al. | 192/106.2 X |

OTHER PUBLICATIONS

"The Two-Mass Flywheel-A Torsional Vibration Damper for the Power Train of Passenger Cars-State of the Art and Further Technical Development," Sebulke, SAE Technical Paper Series 870394, Feb. 1987.

Primary Examiner—Leslie A. Braun
Assistant Examiner—Andrea Pitts
Attorney, Agent, or Firm—Darby & Darby

[57] ABSTRACT

Apparatus for transmitting torque from the output shaft of the engine to the input shaft of the variable-speed transmission in a motor vehicle has a primary flywheel which is connectable to the output shaft, a secondary flywheel which is connectable to the input shaft by engaging a friction clutch, and one or more dampers which oppose rotation of the flywheels relative to each other. The flywheels define an annular chamber for the damper or dampers, and such chamber surrounds two closely adjacent portions of the flywheels which define a radially extending clearance for the flow of cooling air. The radially inner portion of the chamber is separated from the clearance by an annular seal which is located at most midway between the radially innermost and radially outermost portions of an annular friction surface on the secondary flywheel. Such friction surface is adjacent one friction lining of a clutch plate forming part of the friction clutch and being connectable to the input shaft of the transmission. An antifriction bearing is installed between the flywheels radially inwardly of the clearance.

12 Claims, 6 Drawing Sheets

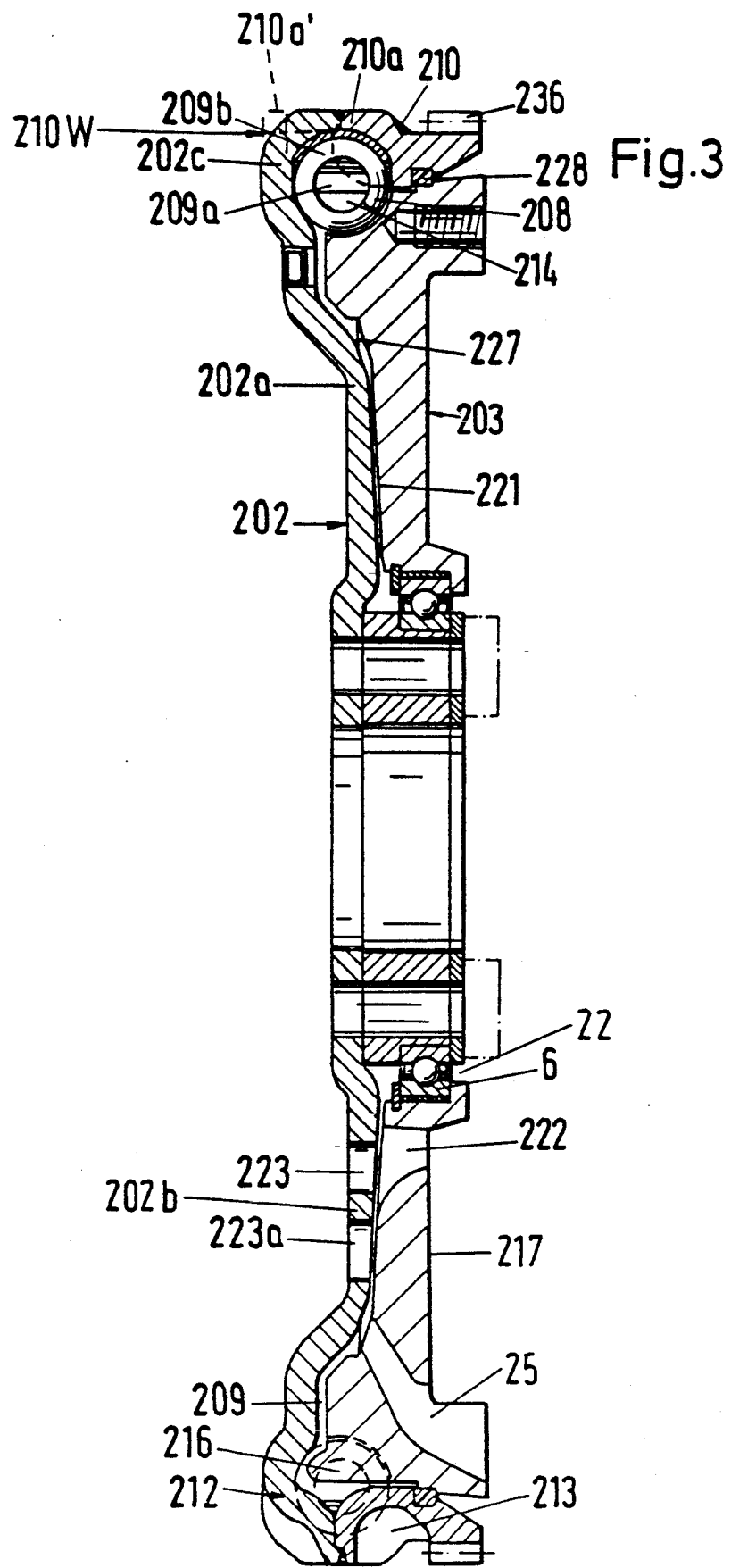

APPARATUS FOR TRANSMITTING TORQUE BETWEEN THE ENGINE AND THE TRANSMISSION OF A MOTOR VEHICLE

This application is a division of application Ser. No. 07/708,930, filed May 31, 1991 now U.S. Pat. No. 5,150,777.

BACKGROUND OF THE INVENTION

The invention relates to torque transmitting apparatus in general, and more particularly to improvements in apparatus which can be used to transmit torque in the power trains of motor vehicles. Still more particularly, the invention relates to improvements in apparatus for transmission of torque between the output element of an engine and the input element of a variable-speed transmission in a motor vehicle.

Published German patent application No. 37 21 705 discloses a torque transmitting apparatus wherein a primary flywheel is connectable to the output shaft (e.g., a crankshaft) of a combustion engine and a secondary flywheel, which is coaxial with and is rotatable relative to the first flywheel and is connectable to the input shaft of a variable-speed transmission by way of a friction clutch. A bearing is installed between the two flywheels, and a damper is provided to oppose rotation of the flywheels relative to each other. The damper is installed in an annular chamber which is sealed from the atmosphere and contains a set of coil springs acting in the circumferential direction of the flywheels. The annular chamber is formed by portions of at least one of the flywheels, and one of the flywheels has a friction surface which can be engaged by a friction lining of a clutch plate serving to transmit torque to the input shaft of the transmission when the clutch is engaged.

Torque transmitting apparatus of the above outlined character have found widespread acceptance in the automobile making industry and are used in motor vehicles wherein the engine and the transmission extend in the direction of forward movement of the vehicle. In such vehicles, the space under the hood is not as limited as in vehicles wherein the engine and the transmission extend transversely of the direction of forward movement. On the other hand, there exists an urgent need for torque transmitting apparatus which exhibit the advantages of the aforedescribed apparatus and are sufficiently compact to find room in motor vehicles with transversely extending engine-transmission aggregates.

OBJECTS OF THE INVENTION

An object of the invention is to provide a simple, compact and inexpensive torque transmitting apparatus which can be utilized in a wide variety of motor vehicles including those with longitudinally extending as well as those with transversely extending engine-transmission aggregates.

Another object of the invention is to provide an apparatus which is considerably shorter, as seen in the axial direction of its flywheels, than heretofore known torque transmitting apparatus.

A further object of the invention is to provide a novel and improved mounting of the flywheels in a torque transmitting apparatus of the above outlined character.

An additional object of the invention is to provide novel and improved primary and secondary flywheels for use in the above outlined apparatus.

Still another object of the invention is to provide novel and improved dampers for use between the primary and secondary flywheels and novel and improved torque transmitting devices which are designed to turn one of the flywheels in response to rotation of the other flywheel.

A further object of the invention is to provide novel and improved means for confining the supply of fluid which is used to lubricate the component parts of the damper or dampers.

An additional object of the invention is to provide an apparatus wherein one of the flywheels can be at least substantially confined within the other flywheel.

Another object of the invention is to provide novel and improved means for cooling the flywheel which cooperates with the friction clutch.

An additional object of the invention is to provide the apparatus with novel and improved means for preventing overheating of sensitive components, particularly the components of the damper or dampers.

A further object of the invention is to provide an apparatus which can be at least partially assembled at the manufacturing plant and can be transported to storage and/or to the locale of use in a simple and space-saving manner.

An additional object of the invention is to provide an apparatus which is designed with a view to ensure simple, rapid and convenient installation in the power train of a motor vehicle.

SUMMARY OF THE INVENTION

One feature of the present invention resides in the provision of an apparatus for transmitting torque in a motor vehicle. The improved apparatus comprises a first rotary flywheel which is connectable with the engine of a vehicle, a second rotary flywheel which is connectable with the transmission of the vehicle by a clutch, at least one antifriction bearing between the flywheels, and at least one damper which is operative to oppose rotation of the flywheels relative to each other and is disposed in an at least partly sealed annular chamber which is defined at least in part by at least one of the flywheels, and more particularly in a toroidal portion of the chamber which is defined by one or more toroidal portions of the first flywheel. The at least one damper has energy storing elements (e.g., arcuate coil springs) acting in the circumferential direction of the flywheels, and the clutch has a clutch plate which is adjacent an annular friction surface of one of the flywheels. The chamber has a radially inner portion which extends radially inwardly at most halfway between the radially innermost and radially outermost portions of the friction surface.

The flywheels have confronting portions which are disposed radially inwardly of the annular chamber and define a preferably narrow clearance. That part of the first flywheel which is adjacent the clearance can constitute a substantially disc-shaped and substantially radially extending portion which is immediately adjacent the engine when the first flywheel is connected to the engine. That portion of the second flywheel which is adjacent the clearance preferably extends at least halfway between the innermost and outermost portions of the friction surface.

The at least one bearing is located radially inwardly of the friction surface, and at least a portion of the friction surface is preferably located in a plane which intersects or is closely adjacent the at least one bearing.

At least one of the flywheels is preferably provided with means for admitting at least one stream of air into and for evacuating air from the clearance. To this end, the first flywheel can be provided with at least one substantially axially parallel opening which communicates with the clearance. Furthermore, the second flywheel can be provided with at least one substantially axially parallel first opening which is disposed radially inwardly of the friction surface, and with at least one substantially axially parallel second opening which is disposed radially outwardly of the friction surface. The first and second openings of the second flywheel communicate with the clearance, and at least the second opening or openings can direct air from the clearance against or into the clutch.

At least one of the two flywheels can be provided with at least one ventilating channel which extends between a first opening and a second opening. The at least one channel can be provided in that side of the first flywheel which is adjacent the clearance or in that side of the second flywheel which is adjacent the clearance.

A further feature of the present invention resides in that, in addition to the aforementioned disc-shaped portion which is adjacent the clearance, the first flywheel comprises a substantially axially extending second portion which is disposed radially outwardly of the first portion and surrounds a first part of the toroidal portion of the annular chamber, and a wall which surrounds another part of the toroidal portion of the chamber and has a substantially radially inwardly extending washer-like portion terminating radially outwardly of the friction surface.

At least one annular seal is preferably provided between and directly engages the two flywheels intermediate the clearance and the annular chamber. The means for at least substantially sealing the chamber from the atmosphere preferably further comprises an annular sealing element which is interposed between the flywheels and is located radially outwardly of the friction surface. The sealing element can be disposed between the aforementioned wall of the first flywheel and the second flywheel. In accordance with an additional feature of the invention, the wall and/or the sealing element is located radially outwardly of the at least one second opening in the second flywheel.

The at least one second opening of the second flywheel is located at a first radial distance from the axis of the second flywheel, and the apparatus further comprises means for securing the clutch to the second flywheel. Such securing means can comprise bolts, screws or other fasteners and is preferably disposed at a second distance from the axis of the second flywheel; such second distance preferably matches or approximates the first distance.

The clutch is preferably a friction clutch and further comprises an axially movable pressure plate which is adjacent the clutch plate and is rotatable with the second flywheel, and at least one spring (preferably a diaphragm spring) which serves to bias the pressure plate against the clutch plate so that the clutch plate bears against the friction surface. The pressure plate has a second annular friction surface which is adjacent the clutch plate. The first mentioned friction surface is provided on the second flywheel, and at least one of the parts including the second flywheel and the pressure plate has at least one channel at the respective friction surface. Such channel can extend exactly radially or substantially radially of the second flywheel or in a direction other than radially. For example, the channel can have an arcuate shape and can slope outwardly and forwardly or rearwardly, as seen in the direction of rotation of the second flywheel In accordance with another feature of the invention, the apparatus comprises means for transmitting torque between the flywheels. Such torque transmitting means can include torque transmitting elements which extend into the chamber and are provided on a radially outer portion of the flywheel other than that which defines at least a portion of the annular chamber. The confronting portions which define the clearance are located radially inwardly of the radially outer portion of the other flywheel. As a rule, the friction surface is provided on the second flywheel and the chamber is defined—at least in part—by the first flywheel. The second flywheel has a first side at the friction surface and a second side facing away from the friction surface, and the torque transmitting elements can be disposed at the second side of the second flywheel and engage the energy storing elements in the chamber. The radially innermost portions of torque transmitting elements at the second side of the second flywheel can be spaced apart from the axis of the second flywheel a distance which at least matches the distance of the axis of the second flywheel from a point substantially midway between the radially innermost and radially outermost portions of the friction surface.

The torque transmitting means can further comprise a substantially ring-shaped holder for the torque transmitting elements which preferably extend substantially radially outwardly of the holder and alternate with the energy storing elements in the chamber.

Instead of being rigid with a common holder, the torque transmitting elements can include substantially segment-shaped components which are individually secured to the other flywheel. Each such segment-shaped component can include a base which extends in the circumferential direction of the other flywheel and an arm which extends substantially radially outwardly from the base and engages one of the energy storing elements in the chamber. Each base can be affixed to the other flywheel by a pair of fasteners, and the fasteners of each pair can be spaced apart from each other in the circumferential direction of the other flywheel a distance which is greater than the distance of a fastener from a point substantially midway between the radially innermost and radially outermost portions of the respective arm.

The torque transmitting means can be secured to the second flywheel by rivets, particularly by blind rivets. The heads of such rivets are preferably located at the second side of the second flywheel, i.e., at that side which faces away from the friction surface of the second flywheel. Alternatively, the torque transmitting means can be secured to the second flywheel by bolts, screws or other threaded fasteners. A thermal barrier can be interposed between the torque transmitting means and the other flywheel. The means for sealing the chamber from the atmosphere can comprise a first portion which is disposed radially inwardly of fasteners for the torque transmitting means and a second portion which is located radially outwardly of such fasteners. At least one portion of the sealing means can be secured to the second flywheel by rivets, and such sealing means can be clamped between the torque transmitting means and the other flywheel. The fasteners which secure the sealing means to the other flywheel can be the same fasteners (such as the aforementioned bline rivets) which secure the torque transmitting means to the other flywheel.

The first portion of the sealing means can be integral with the second portion, and at least one of these portions can contain a heat insulating material.

A starter gear can be made of one piece with that portion of the one flywheel (normally the first flywheel) which defines at least a portion of the annular chamber for the damper or dampers. That portion of the first flywheel which defines at least a part of the chamber can include a cylinder or can constitute a cylinder which is located radially outwardly of the chamber and extends axially of the one flywheel along the entire energy storing elements in the chamber.

The torque transmitting elements which extend into the chamber can be integral with the radially outer portion of the other flywheel. Such torque transmitting elements can constitute radially outwardly extending cast projections which alternate with the energy storing elements in the chamber.

The torque transmitting means can comprise first torque transmitting elements which are provided on one of the flywheels and second torque transmitting elements which are provided on the other flywheel. The first torque transmitting elements can be located radially outwardly of the second torque transmitting elements. The torque transmitting elements of one of the flywheels can include pairs of depressions which are provided on the flywheel defining at least a portion of the chamber and extend into the chamber between the energy storing elements, and the depressions of each such pair are then separated from each other by an energy storing element of the other flywheel. The torque transmitting elements of one flywheel can overlie approximately one half of the adjacent energy storing elements in the chamber, and the energy storing elements of the other flywheel can overlie or overlap the other half of the adjacent energy storing elements. The torque transmitting elements on one of the flywheels can extend substantially diametrically of and across the adjacent energy storing elements in the chamber, and the energy storing elements of the other flywheel can include pairs of depressions or partitions which flank the torque transmitting elements of the one flywheel.

The first flywheel has holes for fasteners which are used to secure the first flywheel to the rotary output element of the engine, and such holes can be disposed radially inwardly or radially outwardly of the bearing between the flywheels. If the holes are provided radially outwardly of the bearing, the second flywheel is provided with openings which are in at least partial alignment with the holes of the first flywheel to permit passage of a tool which is used to rotate the fasteners (such fasteners can constitute screws).

Another feature of the invention resides in the provision of a torque transmitting apparatus which comprises a first rotary flywheel having a substantially disc-shaped substantially radially extending portion which is connectable with the rotary output element of the engine in a motor vehicle, and a second rotary flywheel which is coaxial with and is rotatable relative to the first flywheel and is connectable with the transmission of the vehicle by a clutch having a clutch plate adjacent an annular friction surface on the second flywheel. The first flywheel further comprises a substantially axially extending portion which defines a first portion of an annular chamber and extends axially toward the second flywheel, and a ring-shaped wall which is adjacent the axially extending portion and defines a second portion of the chamber. The inner diameter of the wall is greater than the diameter of the radially outermost portion of the friction surface, and the apparatus further comprises at least one damper which is installed in the chamber to oppose rotation of the two flywheels relative to each other.

A further feature of the invention resides in the provision of a torque transmitting apparatus which comprises a first rotary flywheel connectable with the engine of a motor vehicle, and a second rotary flywheel which is coaxial with and is rotatable relative to the first flywheel and is connectable with the transmission of the motor vehicle by a friction clutch. The second flywheel has a first friction surface and the clutch comprises (a) a pressure plate having a second friction surface, and (b) a clutch plate between the two friction surfaces. The second flywheel and/or the pressure plate has at least one substantially radially extending ventilating channel at the respective friction surface, and the apparatus further comprises a damper which serves to oppose rotation of the two flywheels relative to each other.

An additional feature of the invention resides in the provision of a torque transmitting apparatus which comprises a first rotary flywheel connectable to the engine of a motor vehicle, a second rotary flywheel which is coaxial with and is rotatable relative to the first flywheel and is connectable to the transmission of the motor vehicle by a friction clutch and has a friction surface adjacent a clutch plate of the clutch, at least one antifriction bearing between the flywheels, and at least one damper which is operative to oppose rotation of the flywheels relative to each other and has energy storing elements in an annular chamber which is defined at least in part by one of the flywheels and contains a supply of viscous fluid. The one flywheel has a toroidal portion which defines a portion of the chamber and closely conforms to adjacent portions of energy storing elements in the chamber, and the apparatus further comprises means for at least substantially sealing the chamber from the atmosphere. The sealing means includes at least one seal which is interposed between the flywheels. The at least one seal and/or the toroidal portion of the one flywheel is located radially outwardly of the friction surface of the second flywheel.

Still another feature of the invention resides in the provision of a torque transmitting apparatus which comprises a first rotary flywheel connectable with the engine of a motor vehicle, a second rotary flywheel which is coaxial with and is rotatable relative to the first flywheel and is connectable with the transmission of the motor vehicle, at least one damper which is provided in an annular chamber defined by a toroidal portion of one of the flywheels, and means for transmitting torque between the flywheels. The torque transmitting means comprises torque transmitting elements which are provided on the radially outermost portion of the other flywheel and extend into the chamber.

An additional feature of the invention resides in the provision of a torque transmitting apparatus which comprises a first rotary flywheel connectable with the engine of a motor vehicle, a second rotary flywheel coaxial with and rotatable relative to the first flywheel and connectable with the transmission of the motor vehicle, means for transmitting torque between the flywheels including torque transmitting elements provided on one of the flywheels, and a thermal insulator or barrier interposed between the torque transmitting elements and the one flywheel.

A further feature of the invention resides in the provision of a torque transmitting apparatus which comprises a first rotary flywheel which is connectable to the engine of a motor vehicle and includes a toroidal portion defining an annular chamber and provided with an integral starter gear, a second rotary flywheel which is coaxial with and is rotatable relative to the first flywheel and is connectable to the transmission of the motor vehicle, and at least one damper which is installed in the chamber and serves to oppose rotation of the flywheels relative to each other.

Another feature of the invention resides in the provision of a torque transmitting apparatus which comprises a first flywheel connectable with the engine of a motor vehicle, a second flywheel which is rotatable relative to and is coaxial with the first flywheel and is connectable to the transmission of the motor vehicle, at least one antifriction bearing between the flywheels, and means for fastening the first flywheel to the engine. The first flywheel has holes for the fastening means, and such holes are disposed radially inwardly of the at least one bearing.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 3 is an axial sectional view of the flywheels, bearing and damper in a further apparatus;

DESCRIPTION OF PREFERRED EMBODIMENTS

Figure 1:
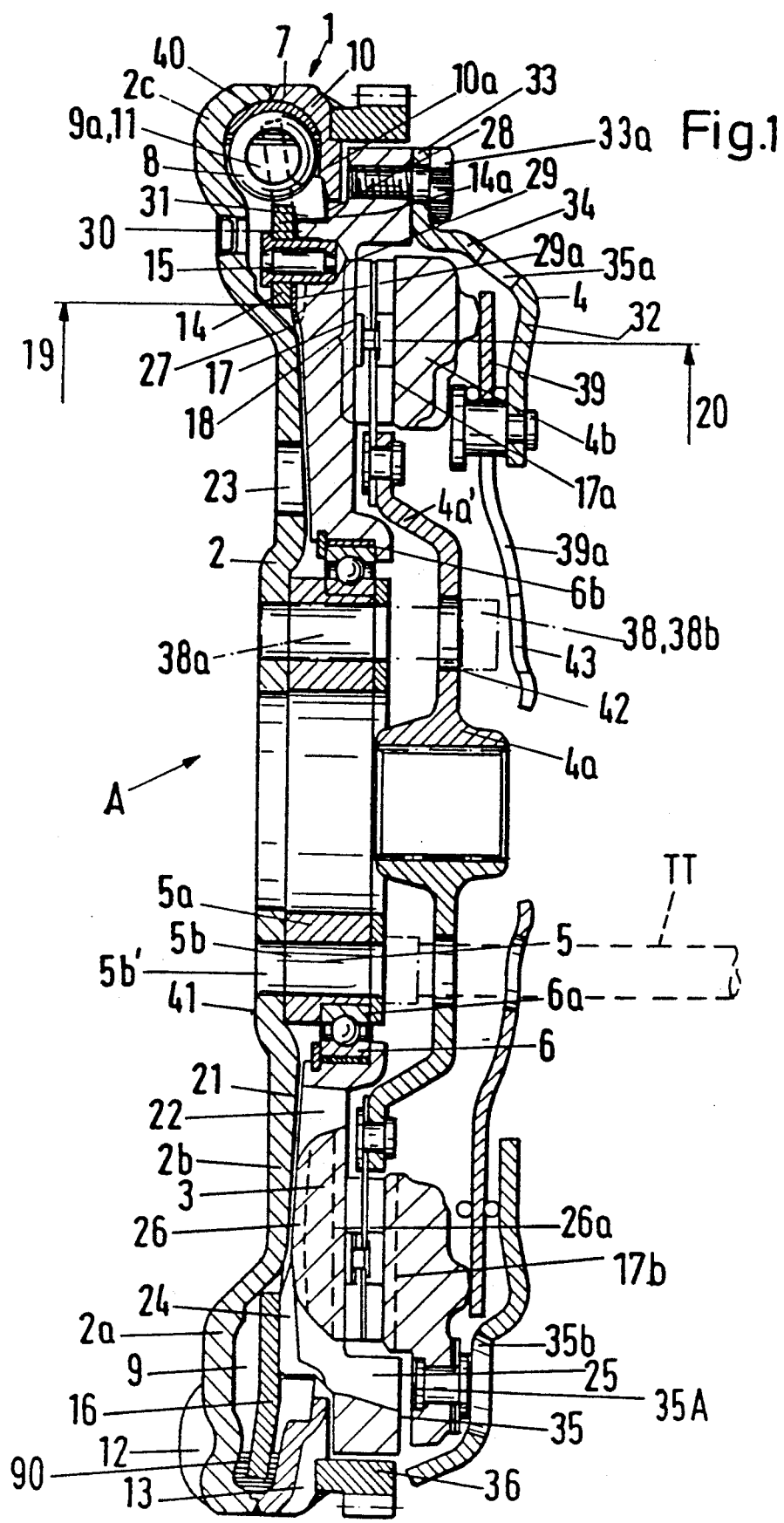
FIG. 1 is an axial sectional view of a torque transmitting apparatus which embodies one form of the invention.
Figure 1A:
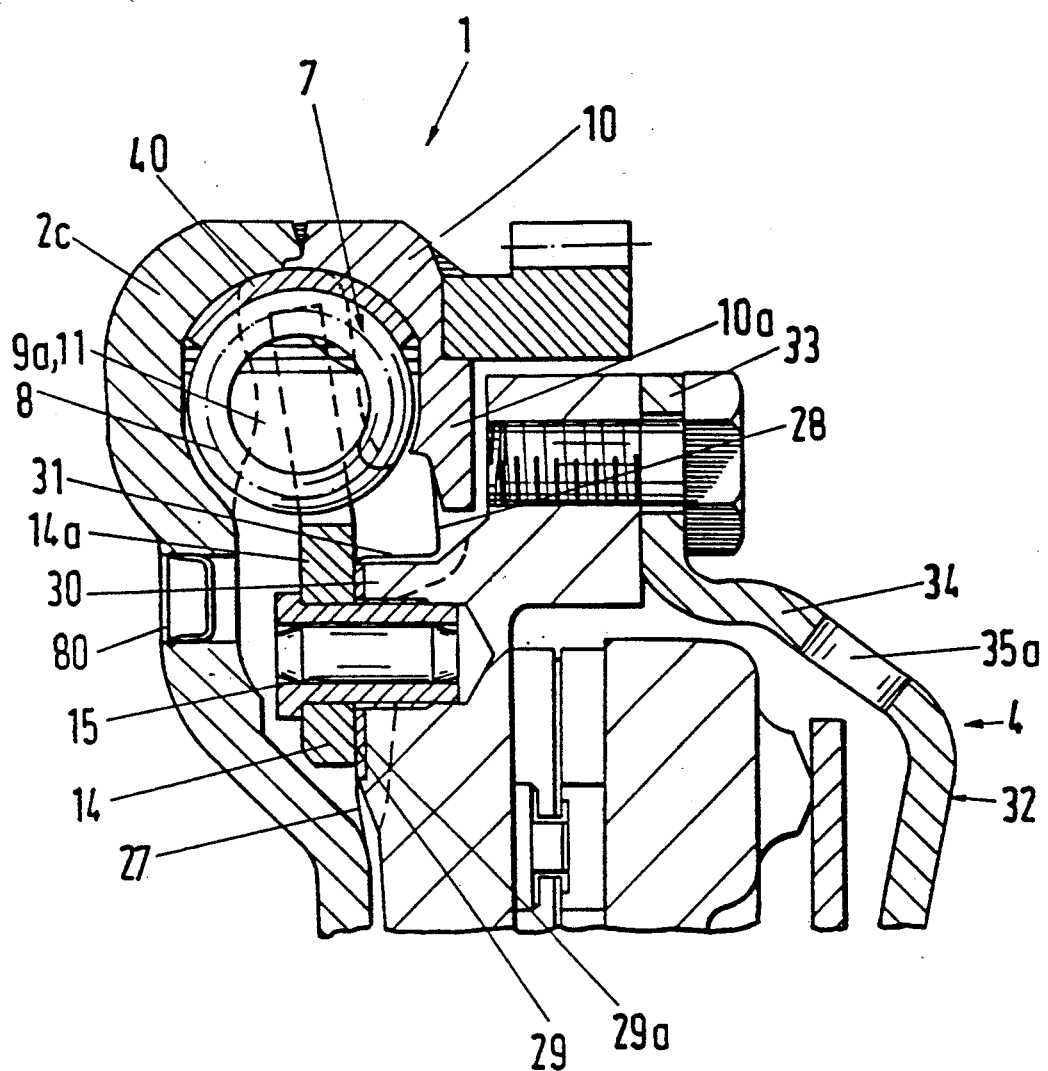
FIG. 1a is an enlarged view of the structure in the upper portion of FIG. 1.

Referring first to FIGS. 1 and 1a, there is shown an apparatus 1 which is designed to transmit torque in the power train of a motor vehicle, and more specifically between the rotary output element (e.g., a crankshaft) of an internal combustion engine and the rotary input element of a variable-speed transmission of a motor vehicle. Reference may be had to commonly owned U.S. Pat. No. 4,989,710 granted Feb. 5, 1991 which shows a different torque transmitting apparatus between the crankshaft of an engine and the input shaft of a transmission in a motor vehicle.

The torque transmitting apparatus 1 comprises a first rotary flywheel or primary flywheel 2 which is connectable to the output element of the engine, a second rotary flywheel or secondary flywheel 3 which receives torque from the primary flywheel 2 by way of a damper 7, and a friction clutch 4 which can be engaged to transmit torque from the secondary flywheel 3 to the input element of the transmission. The clutch 4 comprises a housing or cover 32 which is non-rotatably connected (at 33a) to the flywheel 3, a clutch plate 4a having a hub which can be non-rotatably connected to the input element of the transmission, an axially movable pressure plate 4b, and a diaphragm spring 39 which serves to bias the pressure plate 4b axially against the adjacent friction lining of the clutch plate 4a so that the other friction lining of this clutch plate is caused to bear against an annular friction surface 17 of the flywheel 3 when the clutch 4 is engaged to transmit torque from the flywheel 3 to the transmission.

An antifriction bearing 6 (here shown as a ball bearing with a single row of rolling elements 6a) is installed between the flywheels 2 and 3, and such bearing is disposed radially outwardly of holes 5 for the shanks 38a of fasteners 38 (e.g., screws) which are used to affix the flywheel 2 directly to the output element of the engine.

The damper 7 operates to oppose rotation of the flywheels 2, 3 relative to each other and includes a set of energy storing elements 8 in the form of arcuate coil springs extending circumferentially of the flywheels. The energy storing elements 8 (hereinafter called springs for short) are installed in the toroidal radially outer portion 9a of an annula chamber 9 which is at least substantially sealed from the atmosphere and is defined, at least in part, by the primary flywheel 2. The chamber 9 is at least partially filled with a viscous fluid 90, such as oil or grease.

The primary flywheel 2 is assembled of two sections, namely a first or main section 2a which is a sheet metal stamping and a second section 10 which is a stamped sheet metal wall welded to the section 2a radially outwardly of the toroidal portion 9a of the chamber 9. The section 2a includes a substantially radially extending substantially disc-shaped portion 2b and a substantially axially extending toroidal portion 2c which is disposed radially outwardly of the disc-shaped portion 2b and is welded to the wall 10 in a plane which is normal to the common axis of the flywheels 2, 3 and halves or practically halves the chamber 9. The central part of the disc-shaped portion 2b carries a concentric axial protuberance 5a which has axially parallel holes or bores 5b constituting the major portions of holes 5 for the fasteners 38. The remaining portions 5b' of the holes 5 are provided in the disc-shaped portion 2b. The inner race of the bearing 6 is recessed into the external surface of the protuberance 5a, and the outer race of this bearing is recessed into the adjacent radially innermost portion of the flywheel 3 with the interposition of a suitable thermal insulator 6b which reduces the likelihood of overheating the bearing 6 by heat which is generated when the left-hand friction lining of the clutch plate 4a slips relative to the friction surface 17 of the secondary flywheel 3.

The substantially axially extending toroidal portion 2c of the primary flywheel 2 surrounds and closely conforms to one-half of the radially outer portion of each spring 8, the same as the adjacent axially extending toroidal radially outer portion of the wall 10. At least a substantial part of the axially extending toroidal portion 2c is offset relative to the disc-shaped portion 2b in a direction toward the engine, i.e., it extends to the left beyond the exposed outer side 41 of the disc-shaped portion 2b. The toroidal portion 2c and the axially extending toroidal portion of the wall 10 are substantial mirror images of each other with reference to the aforementioned plane which halves the chamber 9 and is normal to the common axis of the flywheels 2 and 3.

The wall 10 can be made of metallic sheet material and its radially inwardly extending circular portion 10a terminates short of the radially outermost portion of the friction surface 17 at the right-hand side of the flywheel 3.

The chamber 11 is subdivided into a series of arcuate compartments 11, one for each of the springs 8. The compartments 11 are defined by torque transmitting means including torque transmitting elements on the flywheel 2 and torque transmitting elements on the flywheel 3. The torque transmitting elements of the flywheel 2 include depressions which are formed as a result of impression of pockets 12 into the external surface of the axially extending toroidal portion 2c and depressions which are developed as a result of impression of pockets 13 into the external surface of the wall 10. Each depression which is obtained due to the provision of a pocket 12 is located opposite a depression which is obtained due to the provision of a pocket 13 (as seen in the axial direction of the flywheel 2). The torque transmitting means 14 on the flywheel 3 comprises a ring-shaped holder 14a at the left-hand side of the flywheel 3 (i.e., at the side facing away from the side which is provided with the friction surface 17) and discrete torque transmitting elements or arms 16 which extend radially outwardly from and are integral with the holder 14a. The arms 16 alternate with the springs 8, the same as the pairs of depressions of the flywheel 2. Thus, each spring 8 is compressed between two depressions of the flywheel 2 and an arm 16 on the flywheel 3 when at least one of the flywheels is caused to turn relative to the other flywheel against the opposition of the damper 7.

Figure 2:
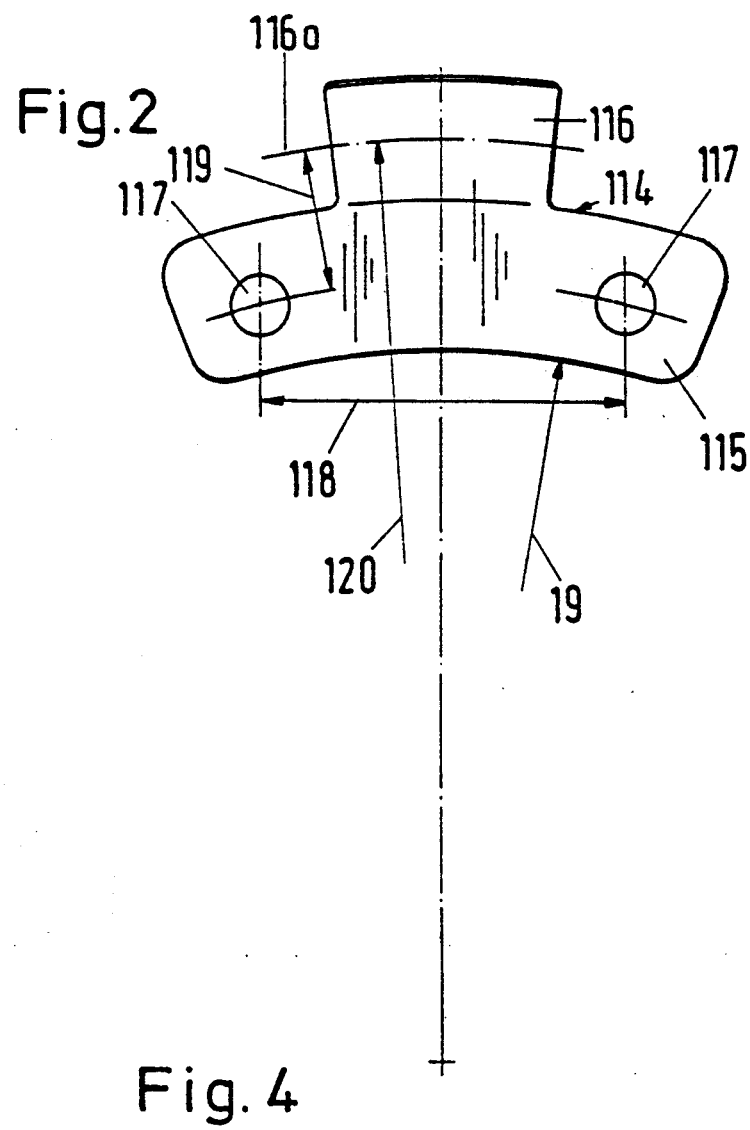
FIG. 2 is an elevational view of a torque transmitting device which can be utilized in a slightly modified version of the improved apparatus.

The holder 14a can constitute a one-piece ring or it can be assembled of several sections or segments which are fastened to the radially outer portion of the flywheel 3. One individual segment 114 of a composite torque transmitting means for use on the secondary flywheel 3 is shown in FIG. 2.

The one-piece ring-shaped holder 14a of FIGS. 1 and 1a is connected to the left-hand side of the flywheel 3 by fasteners in the form of blind rivets 15 having exposed ends or heads at the left-hand side of the holder 14a adjacent the radially innermost part of axially extending toroidal portion 2c of the flywheel 2. The illustrated arms 16 extend substantially radially outwardly from the holder 14a, and each such arm 16 is normally located exactly midway between a pair of pockets 12, 13 (i.e., between two aligned depressions of the flywheel 2 when the composite flywheel including the flywheels 2 and 3 is idle.

The positions of torque transmitting means on the flywheels 2 and 3 are selected in such a way that at least 50% of the width 18 of the annular friction surface 17 is located radially inwardly of the radially innermost part of the torque transmitting means. FIGS. 1 and 1a show that a portion of the holder 14a extends radially inwardly beyond the radially outermost portion of the friction surface 17 but that the arms 16 as well as the pockets 12 and 13 are located radially outwardly of such friction surface. The inner diameter of the torque transmitting means including the holder 14a, the arms 16, the depressions formed by the pockets 12 and depressions formed by the pockets 13 is indicated at 19, and the diameter of the median portion (midway between the radially innermost and radially outermost portions) of the friction surface 17 is indicated at 20.

The just discussed positioning of the torque transmitting means renders it possible to install the rivets 15 very close to the radially outermost portion of the flywheel 3 and at or close to the radially outermost portion of the friction surface 17. This, in turn, renders it possible to select the dimensions of the chamber 9 in such a way that the radially inwardly extending portion of this chamber does not or need not extend radially inwardly beyond the median portion (diameter 20) of the friction surface 17. Such selection of the chamber 9 renders it possible to position the radially inner portions of the flywheels 2 and 3 into close or immediate proximity to each other so that they define a narrow or very narrow clearance 21 which is preferably disposed in a plane that intersects the common axis of the flywheels 2, 3 at an angle of 90°. In the torque transmitting apparatus 1 of FIG. 1, the clearance 21 extends radially outwardly from the protuberance 5a and all the way to an annular seal 27 which is installed between and bears directly against the flywheels 2, 3 at the level of the holder 14a of torque transmitting arms 16 on the flywheel 3. Thus, the clearance 21 extends radially outwardly close to the radially outermost portion of the friction surface 17. The feature that the flywheels 2, 3 are immediately adjacent each other along a large part of or along the entire disc-shaped portion 2b contributes significantly to compactness of the torque transmitting apparatus 1 in the axial direction of the flywheels. Such compactness is desirable and important in all types of motor vehicles but even more in motor vehicles wherein the engine and the transmission extend transversely of the direction of forward movement of the vehicle. Since the secondary flywheel 3 is immediately adjacent a large part of the primary flywheel 2, the entire clutch 4 is also moved very close to the primary flywheel.

The width of the clearance 21 depends on the circumstances of use of the apparatus 1 and is normally between 0.5 and 4 mm. It is preferred to select the width of the clearance 21 (as seen in the axial direction of the flywheels 2 and 3) in such a way that the width of not less than 50% of the clearance (as measured radially of the flywheels) is between 1 and 2 mm.

The clearance 21 can be used with advantage to facilitate or promote adequate cooling of neighboring parts including the two flywheels, the torque transmitting means 12, 13, 14, 14a, 16, the viscous fluid 90 in the chamber 9, the springs 8 and the bearing 6. To this end, the flywheels 2, 3 are provided with means for circulating at least one stream of cool atmospheric air through the clearance 21 when the flywheels rotate about their common axis. As shown, the flywheel 3 is provided with one or more first substantially axially extending openings 22 which are disposed radially inwardly of the friction surface 17 to admit air into the radially inner portion of the clearance 21, and with one or more second or additional substantially axially extending openings 25 which serve to convey air from the radially outer portion of the clearance 21 in a direction toward the friction clutch 4. In addition, the disc-shaped portion 2b of the flywheel 2 has one or more substantially axially parallel openings 23 which can convey air from the median portion of the clearance 21 in a direction toward the engine, i.e., beyond the outer side 41 of the flywheel 2. The opening or openings 22, 23 and/or 25 can be circular openings or they can constitute elongated slots extending in the circumferential direction of the flywheels. Air streams which enter the clearance 21 through the openings 22 are caused to impinge upon the adjacent part of the disc-shaped portion 2b to thus ensure adequate cooling of the protuberance 5a and of the bearing 6. If the openings 22 are omitted, the clearance 21 receives air through the openings 23 in the disc-shaped portion 2b.

The left-hand side of the flywheel 3 is provided with radially extending channels 24 which are grooves communicating with the clearance 21 and with the openings 25. The channels 24 enlarge the path for the flow of air from the clearance 21 into the openings 25 and also serve to direct cooling air radially or nearly radially outwardly to ensure adequate cooling of the radially outer portion of the flywheel 3. Additional coolant-conveying channels 26 can be provided in the left-hand side of the flywheel 3 to convey air streams radially outwardly from the openings 22 toward the openings 25. One such channel 26 is indicated in FIG. 1 by a broken line. The rate of flow of cool air through the clearance 21 can be increased if the openings 22 and/or 23 and/or 25 are designed to resemble vanes or blades of the type used in blowers.

The right-hand side of the flywheel 3 can be provided with additional channels or grooves 26a which can but need not extend exactly radially of the flywheel. FIG. 1 further shows that at least one side of the pressure plate 4b can be provided with channels 17b for circulation of air along the adjacent friction lining of the clutch plated 4a. The illustrated groove or channel 17b is shown in that (left-hand) side of the pressure plate 4b which includes the annular friction surface 17a. The latter confronts the friction surface 17 and these friction surfaces are located at opposite sides of friction linings at the radially outermost portion of the clutch plate 4a.

The means for at least substantially sealing the chamber 9 from the atmosphere comprises two portions, namely the aforementioned seal 27 at the radially outermost part of the clearance 21 and a ring-shaped sealing element 28 which is installed between the radially inwardly extending portion 10a of the wall 10 and the adjacent radially outermost portion of the flywheel 3. The sealing element 28 is installed radially outwardly of the seal 27 and can constitute a diaphragm spring or a membrane which is clamped between the left-hand side of the flywheel 3 and the holder 14a of torque transmitting arms 16 by the rivets 15. The seal 27 can also constitute a discrete membrane but, in the embodiment of FIGS. 1 and 1a, is of one piece with the sealing element 28, i.e., both portions of the sealing means for the chamber 9 are secured to the flywheel 3 by those fasteners (rivets 15) which are used to secure the holder 14a to the flywheel 3. This contributes to lower cost of the apparatus, especially if the entire sealing means consists of a single part (27+28+29+31) which can be made of a suitable heat-resistant plastic material and is secured to the flywheel 3 simultaneously with the torque transmitting means 14. However, it is equally within the purview of the invention to employ a discrete seal 27 and a discrete sealing element 28, e.g., an elastically deformable membrane, a diaphragm spring or the like.

The seal 27 bears against the inner side of the radially extending disc-shaped portion 2b of the flywheel 2 at a location which is disposed radially outwardly of the diameter 20, i.e., radially outwardly of that portion of the friction surface 17 which is located between the innermost and outermost portions of such surface. That (washer-like) portion 29 of the seal 27 which is traversed by the rivets 15 extends radially outwardly along the left-hand side of the radially outermost portion of the flywheel 3 and is sealingly clamped against the flywheel 3 by the rivets 15. More specifically, the radially extending portion 29 of the seal 27 is clamped against platforms 30 (FIG. 1a) which form part of the flywheel 3 and extend (in the circumferential direction of the flywheel 3) between neighboring openings 25. The portion 29 is provided with openings for the blind rivets 15, and such openings register with the openings in a washer-like thermal barrier 29a which is interposed between the sealing means 27-29, 31 on the one hand and the flywheel 3 on the other hand. This thermal barrier prevents overheating of the membrane which constitutes the sealing means 27-29, 31 and hence an overheating of viscous fluid 90 in the chamber 9. It is to be noted that the two end portions of the membrane which includes the seal 27 and the sealing element 28 are in direct contact with viscous fluid 90 in the chamber 9. The radially extending portion 29 of the seal 27 is integral with an axially extending portion 31 of the sealing element 28, and the axially extending portion 31 overlies the radially outer sides of the platforms 30. The sealing element 28 is located radially outwardly of the seal 27 and radially outwardly of the friction surface 17 on the flywheel 3.

The placing of the seal 27 at a considerable distance from the axis of the flywheel 2 is desirable and advantageous because this results in an enlargement of the radially extending clearance 21 and hence in more satisfactory cooling of the flywheels 2, 3 bearing 6, viscous fluid 90 and springs 8 of the damper 7. The openings 25 of the flywheel 3 are inwardly adjacent the sealing element 28 so that the latter is adequately cooled and cannot transmit heat (or excessive quantities of heat) from the flywheel 3 to the contents (8+90+16) of the chamber 9. Moreover, the sealing element 28 ensures that the streams of air flowing through the openings 25 reduce the temperature of the flywheel 3 close to the source of heat (friction surface 17). Still further, the sealing element 28 ensures that streams of air issuing from the openings 25 are directed into and/or against the component parts of the clutch 4.

The cover or housing 32 of the friction clutch 4 is provided with one or more openings or ports 35a which are preferably located at the junction of the radially and axially extending portions of the cover and permit escape of spent air into the surrounding atmosphere. Gaps 35 between the radially outermost portion of the pressure plate 4b and the adjacent radially outermost portion of the flywheel 3 establish paths for the flow of air from the openings 25 into the cover 32 and through the openings 35a into the atmosphere. Moreover, the gaps 35 can receive portions of leaf springs 35A which non-rotatably but axially movably couple the pressure plate 4b to the cover 32 and bias the pressure plate away from the adjacent friction lining of the clutch plate 4a.

The radially outermost portion 33 of the cover 32 extends radially outwardly and is separably secured to the flywheel 3 by the aforementioned screws, bolts or other suitable fasteners 33a which establish a non-rotatable connection between the cover 32 and the flywheel 3. If necessary, the portion 33 can be provided with openings to permit escape of some air which is to flow out of the cover 32. The gaps 35 can be constituted by suitable depressions or cutouts in the left-hand side of the pressure plate 4b. When the clutch 4 is engaged, the diaphragm spring 39 biases the pressure plate 4b against the clutch plate 4a and the latter bears against the friction surface 17 of the flywheel 3. The circumferentially complete outer marginal portion of the diaphragm spring 39 is surrounded by the axially extending intermediate portion 34 of the cover 32, and the diaphragm spring has radially inwardly extending prongs 39a which must be depressed in a direction to the left in order to disengage the clutch 4, i.e., to enable the leaf springs 35A to pull the pressure plate 4b away from the clutch plate 4a so that the flywheels 2 and 3 can rotate relative to the input element of the transmission. Such input element is non-rotatably received in the hub of the clutch plate 4a.

If the seal 27 is a separate part (i.e., not integral with the sealing element 28), it can be affixed to the flywheel 2 to bear against the flywheel 3 or vice versa, as long as it seals the radially inner portion of the chamber 9 from the clearance 21. The illustrated means 27-29, 31 for sealing the chamber 9 is preferred at this time because both portions (27, 28) of such sealing means can be secured (to the flywheel 3) by a single set of fasteners, namely by the blind rivets 15 which perform the additional function of securing the holder 14a of torque transmitting arms 16 to the flywheel 3.

The thermal insulator or barrier 29a can constitute a washer which is made of highly heat-resistant plastic material. Such thermal barrier is optional if the membrane which constitutes the sealing means for the chamber 9 is made of a heat-resistant or heat insulating material. If the seal 27 and the sealing element 28 are two discrete parts, it often suffices to make the seal or the sealing element of a heat insulating material and to use such sealing means with or without a discrete thermal barrier 29a. If the seal 27 is integral with the sealing element 28 (as actually shown in FIGS. 1 and 1a) and the membrane which includes the seal and the sealing element is made of a heat insulating material, the portions 29, 31 of the membrane constitute a barrier which prevents or reduces the transfer of heat from the flywheel 3 to the seal 27 and sealing element 28 and thence to the contents of the chamber 9.

Discrete thermal barriers can be installed between the segment-shaped torque transmitting segments 114 of the type shown in FIG. 2 and the secondary flywheel.

A starter gear 36 is a separately produced part which is welded to the wall 10 close to the radially outermost portion of the wall. The axial position of the gear 36 is selected in such a way that it is located radially outwardly of and in axial alignment with the secondary flywheel 3, namely, with the axially offset radially outermost portion of the secondary flywheel.

The flywheels 2, 3 and the friction clutch 4 (inclusive of the clutch plate 4a) together constitute a preassembled unit A which can be readily manipulated during transport to storage, during shipment to an automobile assembling plant or to a repair shop, as well as during attachment of the flywheel 2 to the output element of an engine. The unit A further includes the bearing 6 which surrounds the axial protuberance 5a, as well as the damper 7 in the annular chamber 9. Furthermore, the unit A preferably comprises a requisite number of fasteners 38 which serve to secure the flywheel 2 to the output element of the engine. The fasteners 38 (hereinafter called screws) are captured or confined between the flywheel 2 and the flange or carrier 4a' of the clutch plate 4a so that they are in positions of readiness for penetration of their shanks 38a into the tapped bores of the output element. The illustrated screws 38 are allen screws, i.e., their heads 38b are provided with polygonal (hexagonal) sockets for the working end of a suitable torque transmitting tool, not shown. The heads 38b are preferably maintained in such positions (normally close to the flange 4a' or to the prongs 39a of the spring 39) that the tips of the shanks 38a do not project beyond the exposed left-hand side 41 of the disc-shaped portion 2b.

The holes 5 can receive elastically deformable sleeves (not specifically shown) which serve to frictionally engage the free end portions of the shanks 38a so that the screws 38 remain in selected positions during storage and transport of the preassembled unit A. When the unit A is ready to be secured to the output element of an engine, the heads 38b of the screws 38 are rotated and pushed axially whereby the aforementioned elastic sleeves yield to axial pressure of the tool and enable the shanks 38a to penetrate into the tapped bores of the output element. In addition to the elastic sleeves, the screws 38 can be held in captive positions between the flywheel 2 and the flange 4a' or prongs 39a in that the holes 42 in the flange 4a' and/or the holes 43 in the prongs 39a are smaller than necessary permit passage of the heads 38b. The arrangement may be such that the holes 42 permit passage of the heads 38b if the screws 38 are relatively long so that the heads 38b must extend close to the left-hand sides of the adjacent prongs 39a, and that the holes 42 are too small to permit passage of the heads 38b if the screws 38 are relatively short so that the heads 38b can be located to the left of the flange 4a' without necessitating penetration of the shanks 38a into and through the respective holes 5, i.e., beyond the outer side 41 of the flywheel 2. The holes 43 can be larger than necessary to permit passage of the heads 38b if the heads cannot pass through the holes 42.

The holes 43 need not be completely surrounded by the material of the respective prongs 39a, i.e., such holes can constitute recesses in the prongs 39a. Reference may be had to commonly owned U.S. Pat. No. 4,747,586 granted May 31, 1988 to Wolfgang Reik which shows lateral recesses or cutouts in the prongs of a diaphragm spring. Such recesses or cutouts can constitute enlarged portions of slots between neighboring prongs 39a.

The clutch plate 4a of the preassembled unit A is properly centered between the flywheel 3 and the pressure plate 4b of the clutch 4 in such angular position that each of its holes 42 is in at least partial axial alignment with one of the holes 5, namely in an alignment which is necessary that a torque transmitting tool which has been caused to pass through the corresponding hole 43 can introduce its working end into the socket of the respective head 38b in order to drive the shank 38a of the corresponding screw 38 into a tapped bore of the output element of the engine. The same applies for the holes 43 in the prongs 39a of the diaphragm spring 39, i.e., the extent of axial alignment of holes 43 with the adjacent holes 42 should suffice to permit convenient introduction of a torque transmitting tool through the aligned holes 43, 42 (in such order) and into engagement with the head 38b of the respective screw 38.

It is often desirable to distribute the holes 5 in the flywheel 2 in such a way that the holes are not exactly equidistant from each other in the circumferential direction of the protuberance 5a and bearing 6. This is necessary when the flywheel 2 is to be secured to the output element of the engine in a single predetermined angular position. Reference may be had for analogy to commonly owned U.S. Pat. No. 4,493,409 granted Jan. 15, 1985 to Klaus Steeg. It is then necessary to select the angular positions of the holes 42 and 43 accordingly, i.e., so that each hole 43 is in at least partial axial alignment with a hole 42 and that each hole 42 is in at least partial axial alignment with a hole 5. If the differences in mutual spacing of neighboring holes 5 are not very pronounced, the holes 42 as well as the holes 43 can be equidistant from each other provided that they are sufficiently large to permit passage of a torque transmitting tool and engagement of such tool with a head 38b in spite of differences between the mutual spacing of holes 5 on the one hand and the mutual spacing of holes 42, 43 on the other hand.

It is often desirable to select the dimensions of the holes 42 and 43 in such a way that they permit the heads 38b of the screws 38 to pass therethrough. This renders it possible to insert the shanks 38a of the screws 38 into the elastic sleeves in the respective holes 5 shortly prior to actual attachment of the flywheel 3 to the output element of an engine. The elastic sleeves then constitute the only means for capturing the screws 38 and they retain the screws in positions in which the tips of the shanks 38a do not project beyond the outer side 41 of the disc-shaped portion 2b prior to actual rotation and axial displacement of the screws in a direction to the left, as seen in FIG. 1. The lower screw 38 of FIG. 1 is relatively short, i.e., its shank 38a does not project beyond the outer side 41 and its head 38b is located to the left of the flange 4a'. The upper screw 38 of FIG. 1 is longer; its shank 38a does not project beyond the outer side 41 but its head 38b extends all the way into close proximity to the left-hand sides of the aligned prongs 39a.

FIG. 1a shows that the toroidal portion 9a of the chamber 9 contains an arcuate wear-resistant liner 40 which is interposed between the radially outermost portions of the springs 8 and the internal surfaces of axially extending toroidal portion 2c of the flywheel 2 and axially extending toroidal portion of the wall 10. This liner can be assembled of several arcuate trough-shaped sections and is contacted by adjacent convolutions of the springs 8 when the flywheels 2, 3 rotate so that the springs are acted upon by centrifugal force. The material of the liner 40 can be selected in such a way that it undergoes wear instead of the axially extending portion 2c and wall 10. Thus, the liner 40 can be replaced, when necessary, but the radially outermost part of the flywheel 2 (including the portion 2c and the wall 10) remains intact during the entire useful life of the torque transmitting apparatus.

An important advantage of the improved torque transmitting apparatus 1 is its compactness in the axial direction of the flywheels 2 and 3. This is achieved by ensuring that the radially inner portion of the annular chamber 9 does not extend inwardly beyond a location substantially midway (diameter 20) between the radially innermost and radially outermost portions of the friction surface 17. Such positioning of the chamber 9 renders it possible to locate the energy storing elements 8 radially outwardly of the friction surface 17 which is in contrast to the design of many presently known torque transmitting apparatus wherein the damper or dampers are located between the primary and secondary flywheels and extend radially inwardly to the level of friction surface on the flywheel which cooperates with the friction clutch. Moreover, the damper 7 is shielded and protected because it is confined in the chamber 9 and its parts are lubricated by the viscous fluid 90.

Another important advantage of the improved apparatus is that it can dispense with the customary radially extending flange which is used in conventional apparatus to stress the energy storing elements of the damper or dampers. Therefore, the clearance 21 can have a width which is or can be less than 1 mm, i.e., the central portions of the two flywheels can be placed into immediate or very close proximity to each other so that the combined axial length of the flywheels is reduced to a small fraction of the combined axial length of flywheels in apparatus wherein a flange and other parts must be installed between the primary and secondary flywheels.

The space requirements of the improved apparatus in the axial direction of the flywheels 2, 3 are reduced still further in that the disc-shaped portion 2b of the primary flywheel 2 can be placed into immediate proximity to the output element of the engine when the apparatus 1 is properly installed in the power train of a motor vehicle. That portion of the flywheel 3 which cooperates with the section 2a to define the clearance 21 extends from the bearing 6 radially outwardly at least to the diameter 20 and preferably outwardly beyond the halfway point between the radially innermost and radially outermost portions of the friction surface 17. This ensures that the clearance 21 is sufficiently large to permit adequate cooling of all sensitive parts as well as that a large portion of the secondary flywheel 3 is encapsulated or fitted into the primary flywheel 2 with attendant reduction of space requirements in the axial direction of the flywheels. Additional savings in space are achieved in that the bearing 6 is installed in an axial position such that it is preferably intersected by the plane which includes the friction surface 17 or is at least closely adjacent to such plane.

Save for the openings 23 which are provided in the primary flywheel 2, i.e., in a part which is preferably made of sheet metal, the other openings (22, 25) which communicate with the clearance 21 can be made during casting of the secondary flywheel 3. The same applies for the channels 26 and 26a. The gap 35 and the channel or channels 17b can be formed during making of the pressure plate 4b if the latter is a casting.

FIG. 1a shows that the radially inwardly extending portion 10a of the wall 10 terminates radially outwardly of the friction surface 17 on the secondary flywheel 3. However, it is equally possible to reduce the inner diameter of the portion 10a so that it does not exceed or is less than the diameter of radially outermost portion of the friction surface 17. The illustrated design is preferred at this time because it permits introduction of a large part of the secondary flywheel 3 into the substantially pan-shaped body which is the primary flywheel 2. The feature that the inner diameter of the wall portion 10a exceeds the maximum diameter of the friction surface 17 renders it possible to introduce the major part of the flywheel 3 into the flywheel 2 radially inwardly of the toroidal portion 9a of the chamber 9 for the energy storing elements 8 of the damper 7. Moreover, the radially outermost portion of the flywheel 3 can cooperate with the sealing element 28 to seal the adjacent portion of the chamber 9 from the atmosphere.

The radially outermost portion of the friction surface 17 on the flywheel 3 of the torque transmitting apparatus 1 which is shown in FIGS. 1 and 1a is located radially inwardly of the radially innermost portions of the energy storing elements 8. This, too, contributes to compactness of the apparatus because a larger portion of the secondary flywheel 3 as well as the entire friction clutch 4 can be moved axially closer to the outer side 41 of disc-shaped portion 2b of the primary flywheel 2, i.e., closer to the output element of the engine.

The possibility of making the entire primary flywheel 3, including the sections 2a and 10, of a metallic sheet material contributes to lower cost of the improved apparatus.

The distance of the openings 25 in the secondary flywheel 3 from the common axis of the flywheels can equal or approximate the distance of such axis from the fasteners 33a which secure the radially outermost portion 33 of the cover 32 to the adjacent radially outermost portion of the flywheel 3. The fasteners 33a then alternate with the openings 25 in the circumferential direction of the flywheel 3. The openings 25 are in at least partial alignment with openings or ports 35b in the radially extending inner portion of the cover 32. The openings 35a and/or 35b alternate with the fasteners 33a in the circumferential direction of the radially outermost portion 33 of the cover 32.

The channels 26 can be provided in lieu of or in addition to channels 24 which have their radially innermost portions at the level of the seal 27 and extend radially outwardly to convey air to the openings 25 in or close to the radially outermost portion of the flywheel 3.

The channels 26a and 17b in those sides of the flywheel 3 and pressure plate 4b which are provided with friction surfaces 17 and 17a can extend at least from the radially innermost to the radially outermost portions of the respective friction surfaces and can be disposed exactly radially of the common axis of the flywheels 2, 3 or can have an arcuate or other shape and can be oriented in such a way that their inner ends are located forwardly or rearwardly of their outer ends (as seen in the direction of rotation of the flywheel 3 and pressure plate 4b).

It has been found that the axial dimensions of the improved apparatus can be kept to a minimum if the rotoidal portion 9a of the chamber 9 and/or at least one portion (e.g., 28) of means for sealing the chamber 9 from the atmosphere is located radially outwardly of the friction surface 17 because this contributes to the extent of aforediscussed encapsulation of the secondary flywheel 3 into the primary flywheel 2. In the apparatus 1 of FIGS. 1 and 1a, the toroidal portion 9a of the chamber 9 and the sealing element 28 are located radially outwardly of the friction surface 17. FIG. 1a further shows that the clearance 21 can extend radially outwardly at least close to or all the way to the seal 27 and hence to the torque transmitting means 14 on the radially outer portion of the secondary flywheel 3.

The reference character 80 denotes a closure which is inserted into and seals an inlet in the axially extending portion 2c of the primary flywheel 2. The closure 80 can be removed to permit inspection of the condition and/or quantity of viscous fluid 90 and replenishment of the supply of such fluid.

Referring to FIG. 2, the arcuate segment-shaped torque transmitting segment 114 which is shown therein cooperates with additional segments 114 (not shown) to replace the torque transmitting means 14 in the apparatus 1 of FIGS. 1 and 1a. The illustrated segment 114 includes an elongated arcuate base or foot 115 which extends in the circumferential direction of the flywheel 3 and is secured to such flywheel by two circumferentially spaced apart fasteners (not shown) receivable in openings 117. The segment 114 further comprises an arm 116 which is integral with and extends radially outwardly from the median portion of the base 115 and is flanked by the openings 117. The arm 116 extends into the chamber 9 and is located between two neighboring springs 8 when the segment 114 is properly affixed to the flywheel 3, i.e., the arm 116 performs the function of one of the arms 16 shown in FIGS. 1 and 1a. Such arm 116 then cooperates with two depressions of the flywheel 2 to cause the corresponding spring 8 to store energy or to store additional energy when at least one of the flywheels 2, 3 is caused to turn relative to the other flywheel.

The arm 116 is located midway between the ends of the base 115, i.e., that portion of the base 115 which extends to the left beyond the arm 116 and is provided with one of the openings 117 is a mirror image of the portion which extends beyond the right-hand end of the arm 116 and is provided with the other opening 117. The distance 118 between the centers of the openings 117 (as measured in the circumferential (tangential) direction of the flywheel 3) is greater than the shortest radial distance 119 between the center of an opening 117 and the central radial zone 116a of the arm 116. The distance of the zone 116a from the axis of the flywheel 3 is indicated at 120. The arrow 120 actually indicates the diameter of the circle which is formed by the arcuate axes of the springs 8 in the annular chamber 9.

As mentioned above, the openings 117 can receive portions of fasteners (such as the blind rivets 15 of FIGS. 1 and 1a) which serve to secure the segments 114 to the flywheel 3. Alternatively, the segments 114 can be secured to the flywheel 3 by bolts, screws or in any other suitable way, e.g., by providing on the flywheel 3 projections which extends into and through the openings 117 and are upset or capped to retain the segments 114 in optimum positions for engagement of their arms 116 with the adjacent springs 8. Alternatively, the segments 114 can be secured to the flywheel 3 by simple pin-and-socket connections, particularly by axially parallel pin-and-socket connections. All that counts is to ensure that the segments 114 are reliably secured to the flywheel 3 and that the fasteners in openings 117 sealingly secure the seal 27 and the sealing element 28 to the flywheel 3 if the mounting of the sealing means for the chamber 9 is the same as, or analogous to, that shown in FIGS. 1 and 1a.

Discrete torque transmitting segments 114 will be utilized to save the high-quality material of the torque transmitting means and to reduce the weight of the apparatus. The provision of two spaced apart openings 117 for discrete fasteners (such as 15) at the distance 118 from each other enhances the stability of the installed segment 114 and hence its useful life.

FIG. 3 shows a portion of a modified torque transmitting apparatus wherein the ring-shaped starter gear 236 is integral with the junction of the axially and radially extending portions of the wall 210 which is welded to the axially extending toroidal portion 202c of first section 202a of the primary flywheel 202. The wall 210 constitutes the second section of the primary flywheel.

The portion 202c extends radially beyond the springs 208 in the toroidal portion 209a of the annular chamber 209, the same as the axially extending toroidal portion 210a of the wall 210. The axially extending portions 202c, 210a are or can be mirror images of each other and their internal surfaces closely follow the outlines of adjacent portions of the springs 208. The internal surface of the axially extending portion 210a extends along an arc of at least 90° (between the twelve and three o'clock positions of the illustrated spring 208), and the internal surface of the axially extending portion 202c also extends along an arc of at least 90° (or more), namely at least between the nine and twelve o'clock positions of the illustrated spring 208.

As indicated in FIG. 3 by broken lines (at 210a'), the axially extending portion 210a of the wall 210 can extend axially across the entire diameter of the set of springs 208 to be welded to the (shortened) portion 202c at 210W or even radially inwardly of 210W. The section 202c then terminates radially inwardly of the axially extending portion 210a', i.e., the peripheral surface of the thus modified portion 202c is adjacent and is welded to the internal surface of the modified portion 210a' to the left of the springs 208.

The internal surface of the radially outermost portion of the flywheel 202 (such radially outermost portion includes the axially extending portions 202c and 210a) is formed with arcuate recesses 209b each of which receives one-half of a spring 208. Analogously, the surface of the radially outermost portion of the flywheel 203 is provided with arcuate recesses 214 each of which receives another half of a spring 208. Thus, each spring 208 extends in part into a recess 209b and in part into a recess 214. The radially inner half of each end convolution of a spring 208 abuts a torque transmitting element 216 between two neighboring recesses 214 of the flywheel 203, and the radially outer half of each end convolution of a spring 208 is engaged by the adjacent partitions 212, 213 between two neighboring recesses 209b. The first half 112 of each partition forms part of the axially extending portion 202c, and the second half 213 of each partition forms part of the axially extending portion 210a. The halves 212 are formed as a result of the provision of pockets in the external surface of the axially extending portion 202c, and the halves 213 are obtained as a result of the formation of pockets in the external surface of the axially extending portion 210a. The torque transmitting elements 216 are cast tongues which are integral parts of the flywheel 203 (see the lower portion of FIG. 3 wherein the tongue 216 extends to the left toward the internal surface of the axially extending portion 202c and overlies approximately the entire radially inner half of the adjacent end convolution of a spring 208).

In contrast to the apparatus 1 wherein the toroidal radially outer portion 9a of the chamber 9 is defined only by the primary flywheel 2 (inclusive of the wall 10), the toroidal radially outer portion of the chamber 209 is defined by the flywheel 202 jointly with the flywheel 203. The toroidal portion 209a is that portion of the chamber 209 which receives the springs 208. The radially inner portion of the chamber 209 extends radially inwardly to the seal 227 at the radially outermost portion of the narrow radially extending clearance 221 between the confronting central portions of the flywheels 202 and 203.

The radial dimension of the chamber 209 can equal or approximate the radial dimension of the chamber 9. The chamber 209 is at least partially filled with a viscous fluid (such as oil or grease), and such fluid is confined in the chamber 209 by the seal 227 as well as by a sealing element 228 (e.g., an O-ring) which is installed between the ring gear 236 and the adjacent radially outermost portion of the flywheel 203. The configuration of the first section 202a of the flywheel 202 can match or approximate that of the section 2a (if one disregards the modified first section which must be employed if the axially extending portion 210a of the wall 210 is replaced with the axially extending portion 210a').

The seal 227 can constitute or act not unlike a diaphragm spring which bears against a shoulder in the left-hand side of the flywheel 203 and reacts against the right-hand side of the flywheel 202 to seal the radially inner portion of the chamber 209 from the radially outermost portion of the clearance 221. The clearance 221 can serve as a means for conveying one or more streams of gaseous coolant which is used to prevent overheating of the flywheels 202, 203 and bearing 6 when the torque transmitting apparatus of FIG. 3 is in actual use. The sealing element 228 is disposed radially outwardly of the seal 227, namely at the level of the axes of the springs 208, i.e., at or close to the level of the axis of toroidal portion 209a of the annular chamber 209. The elastically deformable sealing element 228 can be made of rubber or another elastomeric material. Alternatively, the sealing element 228 can be replaced with a membrane or with a diaphragm spring without departing from the spirit of the invention.

The secondary flywheel 203 is provided with one or more openings 222 which are disposed radially inwardly of the friction surface 217 and communicate with the clearance 221. These openings are adjacent the bearing 6 and can perform the same functions as the openings 22 of the flywheel 3, i.e., they can admit air into the clearance 221 and they can also permit passage of screws (not shown) which are used to secure the flywheel 202 to the output element of an engine as well as the passage of the working end of a tool which is employed to rotate the screws 38 (not shown in FIG. 3) in order to drive the shanks of such screws into the tapped bores of the output element.

The disc-shaped central portion 202b of the primary flywheel 202 is formed with at least one first opening 223 which is nearer to the bearing 6 and with at least one second opening 223a which is nearer to the axially extending portion 202c. The opening or openings 223 are in exact or substantial axial alignment with the openings 222 when the flywheels 202, 203 are not rotated. All other undertakings to ensure adequate cooling of the apparatus of FIG. 3 are or can be identical with those described in connection with FIGS. 1 and 1a. The apparatus of FIG. 3 can also comprise one or more heat barriers which are designed and installed to prevent over-heating of the supply of viscous fluid and/or the springs 208 in the chamber 209. Inversely, the cooling means (including the two openings or the two sets of openings 223, 223a) of the apparatus which is shown in FIG. 3 can be put to use in the apparatus 1 of FIGS. 1 and 1a.

An advantage of the apparatus which embodies the structure of FIG. 3 is its lower cost because the starter gear 236 is one piece with the wall 210, i.e., it is not necessary to weld the starter gear to one of the flywheels. The starter gear 236 is located radially outwardly of the secondary flywheel 203 and can be disposed in a common plane at least with the radially outermost portion of the secondary flywheel. In FIG. 3, the central portion of the flywheel 202 is located to the left of the starter gear 236 and is surrounded by the chamber 209. The illustrated starter gear 236 is coplanar with the clutch plate (not shown in FIG. 3) when the friction clutch is connected to the flywheel 203.

Figure 4:
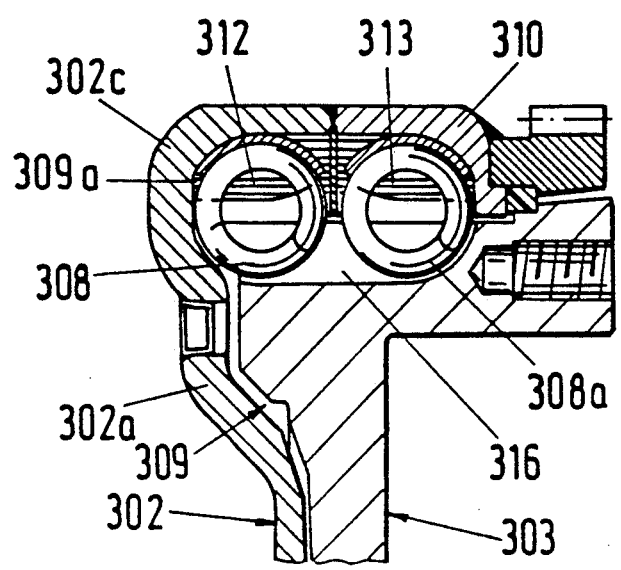
FIG. 4 is a fragmentary axial sectional view of an apparatus which constitutes a modification of the apparatus of FIG. 3.

Referring to FIG. 4, there is shown a portion of a torque transmitting apparatus wherein the toroidal portion 309a of the annular chamber 309 accommodates a damper having two sets of arcuate coil springs 308 and 308a. The two sets of springs operate in parallel and are adjacent each other in the axial direction of the flywheels 302 and 303. The manner in which the springs 308, 308a are stressed when at least one of the flywheels 302, 303 is turned relative to the other flywheel is or can be the same as described in connection with FIG. 3. FIG. 4 merely shows the two halves 312, 313 of a partition on the flywheel 302 and one stressing or torque transmitting element 316 of the flywheel 303. The half partition 313 engages the radially outer half of the adjacent end convolution of a spring 308, the half partition 313 engages the radially outer half of the adjacent spring 308a, and the element 316 engages the inner halves of adjacent end convolutions of a spring 308 and a spring 308a. The axially extending portion 302c of the first section 302a of the flywheel 302 and the axially extending portion 310a of the wall 310 (second section of the flywheel 303) are longer than the corresponding parts 202c, 210a in FIG. 3 because they must extend axially of the flywheels 302, 303 and radially outwardly of both sets of springs 208, 208a. The same holds true for the flywheel 303, i.e., each torque transmitting or stressing element 316 of this flywheel is long enough (in the axial direction of the flywheels 302, 303) to simultaneously engage the radially inner half of the adjacent end convolution of a spring 208 as well as the radially inner half of the adjacent end convolution of a spring 208a.

The wall 310 is welded to the axially extending portion 302c, preferably in a radially extending plane substantially midway between the springs 208 and 208a. The starter gear is welded to the wall 310 so that its gear teeth are located radially outwardly of the springs 208, 208a.

Each partition 312, 313 of the flywheel 302 preferably engages approximately one-half of the adjacent end convolution of a spring 208 and approximately one-half of the adjacent end convolution of a spring 208a, and the same preferably applies for each torque transmitting element 216 on the flywheel 303.

Figure 5:
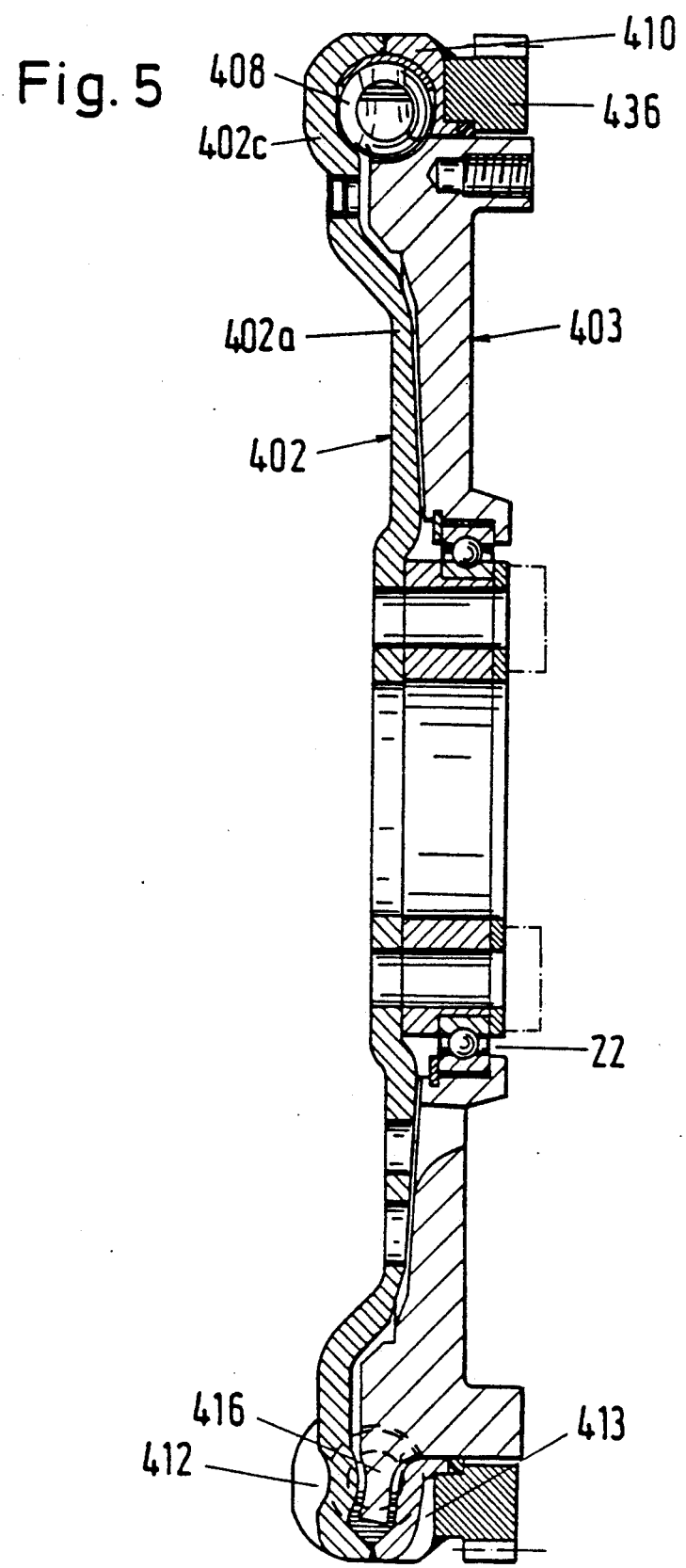
FIG. 5 is an axial sectional view of the flywheels, bearing and damper in another torque transmitting apparatus.

FIG. 5 shows a portion of a torque transmitting apparatus wherein the secondary flywheel 403 is provided with integral radially outwardly extending torque transmitting elements in the form of tongues 416 which perform the function of the torque transmitting elements 16, 116, 216 or 316. The torque transmitting means of the primary flywheel 402 comprises partitions 412, 413 which are integral with the axially extending portion 402c of the section 402a and with the wall 410, respectively. The halves of each partition 412, 413 for springs 408 flank the adjacent tongue 416, and such halves are formed by providing the external surfaces of the portion 402c and wall 410 with suitable pockets, i.e., each partition 412, 413 consists of two depressions which are aligned with each other in the axial direction of the flywheels 402, 403 and are disposed at opposite sides of the adjacent tongue 416.

In all other respects, the apparatus of FIG. 5 is or can be identical with the apparatus of FIG. 3 or with the apparatus of FIG. 1. The apparatus of FIG. 5 differs from the apparatus of FIG. 3 in another respect, namely the starter gear 436 is a separately produced part which is welded to the wall 410, the same as in the apparatus of FIG. 1.

If the flywheel 402 is a casting, the pockets in the external surfaces of the section 402a and wall 410 can be formed in the mold.

Figure 6:
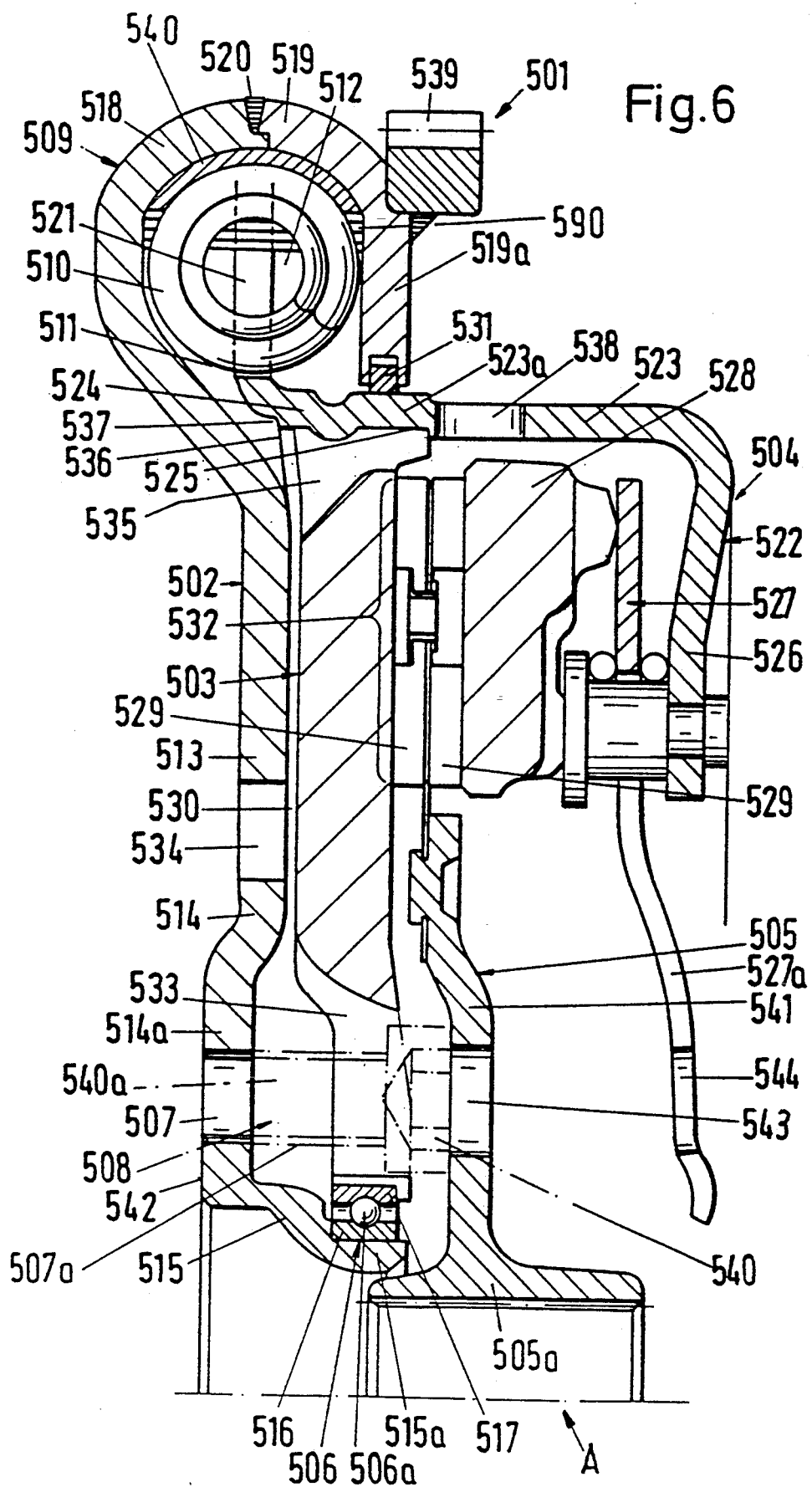
FIG. 6 is a fragmentary axial sectional view of a further torque transmitting apparatus.

The torque transmitting apparatus 501 of FIG. 6 comprises a first or primary flywheel 502 which is connectable to the rotary output element of an internal combustion engine in a motor vehicle, and a second or secondary flywheel 503 which is coaxial with and rotatable relative to the primary flywheel and is connectable with the rotary input element or a variable-speed transmission in the vehicle in response to engagement of a friction clutch 504. The clutch 504 comprises a clutch plate 505 having a centrally located hub 505a which is non-rotatably connectable with the input element of the transmission and is rotated by the secondary flywheel 503 when the clutch is engaged. An antifriction roller bearing 506 (here shown as having a single annulus of spherical rolling elements 506a) is installed between the free end portion 515a of a hollow axial protuberance 515 of the primary flywheel 502 and the adjacent radially innermost portion of the secondary flywheel 503. The diameter of the bearing 506 is relatively small because this bearing is located radially inwardly of holes 507 which are provided in the central part 514a of the disc-shaped portion 514 of main section 513 of the primary flywheel 502. The holes 507 serve to receive the externally threaded shanks 540a of fasteners 508 (here shown as allen screws) which are used to separably connect the primary flywheel 502 to the output element of the engine.

A damper 509 has energy storing elements 510 in the form of arcuate coil springs which act in the circumferential direction of the primary flywheel 502 and are installed in the toroidal radially outermost portion 512 of an annular chamber 511 which is defined by the toroidal radially outer portion 518 of the main section 513 and by the adjacent second section or wall 519 of the primary flywheel 502. The chamber 511 is at least partially filled with a viscous fluid 590, such as oil or grease.

The main section 513, as well as the second section or wall 519, of the primary flywheel 502 is made of metallic sheet material. The central part 514a and the protuberance 515 are of one piece with the toroidal portion 518 of the primary flywheel. The holes 507 are provided in the central part 514a radially outwardly of the protuberance 515 and bearing 506 and are dimensioned in such a way that they can receive the shanks 540a but not the heads 540 of the respective fasteners 508.

The secondary flywheel 503 is a substantially washer-like body which is mounted on the outer race 517 of the bearing 506 and has a centrally located axial recess for the outer race. The inner race 516 of the bearing 506 abuts a shoulder on the end portion 515a of the protuberance 515, and the outer race 517 abuts a shoulder of the secondary flywheel 503; this ensures that the bearing 506 is maintained in an axial position in which its is substantially coplanar with the secondary flywheel 503.

The toroidal portion 518 of the main section 513 of the primary flywheel 502 has a substantially C-shaped or semicircular cross-sectional outline, and its radially outermost part is a substantial mirror image of the adjacent radially outermost part of the section or wall 519. The toroidal portion 518 and the wall 519 are rigidly connected to each other by a welded joint 520 including a seam which is located or close to the plane of arcuate axes of the energy storing elements 510 in the toroidal radially outermost portion 512 of the annular chamber 511. The toroidal portion 518 of the primary flywheel 502 is axially offset relative to the disc-shaped portion 514 in a direction toward the engine (which is assumed to be located to the left of FIG. 6), and the radially outer part of the toroidal portion 518 rather closely follows the outlines of adjacent radially outer portions of the energy storing elements 510, the same as the adjacent radially outer part of the wall 519. As can be seen in FIG. 6, the toroidal portion 518 closely follows and surrounds the left-hand half of the radially outer portion of each energy storing element 510 (between the nine and twelve o'clock positions), and the wall 519 closely follows and surrounds the right-hand half of the outer portion of each energy storing element 510 (substantially between the twelve and three o'clock positions).

The radially inner portion 519a of the wall 519 is disposed in a plane which is substantially normal to the common axis of the flywheels 502, 503 and carries a ring-shaped starter gear 539 which is welded to the wall 519.

The toroidal portion 512 of the chamber 511 is divided into several arcuate compartments, one for each of the energy storing elements 510. The partitions between neighboring compartments (i.e., between neighboring energy storing elements 510) are constituted by integral depressions of the toroidal portion 518 and wall 519. Such depressions are formed by impressing complementary pockets into the external surfaces of the toroidal portion 518 and wall 519. Reference may be had to the pockets 12 and 13 which are shown in FIG. 1. Each compartment for an energy storing element 510 includes a first arcuate recess or groove in the internal surface of the toroidal portion 518 and a second arcuate recess or groove in the internal surface of the wall 519.

The means for transmitting torque from the energy storing elements 510 of the damper 509 to the secondary flywheel 503 comprises arms 521 which are integral parts of the free end portion 523a of the axially extending cylindrical wall 523 of a cover or housing 522 forming part of the friction clutch 504. In the apparatus 501 of FIG. 6, the arms 521 are of one piece with the axially extending portion 523 of the cover 522 and alternate with the energy storing elements 510 in the toroidal portion 512 of the chamber 511. These arms are located in or close to the aforementioned plane which includes the axes of the energy storing elements 510. The arms 521 are further substantially coplanar with the disc-shaped portion 514 of the primary flywheel 502.

The free end portion 523a of the cylindrical portion 523 surrounds the peripheral surface of the secondary flywheel 503 and has radially inwardly extending projections 524 which are received in and fill the adjacent recesses in the peripheral surface of the secondary flywheel. Thus, the fasteners 33a of the apparatus 1 of FIG. 1 can be omitted because the projections 524 (i.e., integral parts of the cover 522) are used as a means for more or less permanently securing the secondary flywheel 503 to the cover 522 against any axially and/or angular movement relative to each other.

The cover 522 is provided with an internal shoulder 525 which serves as an abutment for the secondary flywheel 503 and locates the latter in an optimal axial position in close or immediate proximity to the disc-shaped portion 514 of the primary flywheel 502. When the secondary flywheel 503 abuts the shoulder 525, the recesses in its peripheral surface are inwardly adjacent the free end 523a of the cylindrical portion 523 so that the latter can be deformed radially inwardly to thus provide the aforementioned protuberances 524 which reliably secure the secondary flywheel 503 to the cover 522.

The cover 522 further comprises a substantially radially extending substantially washer-like portion 526 which is integral with the axially extending cylindrical portion 523 and tiltably supports the circumferentially complete annular outer portion of a diaphragm spring 527. The spring 527 acts not unlike a two-armed lever and has radially inwardly extending prongs 527a which must be depressed in a direction to the left in order to interrupt the transmission of torque from the secondary flywheel 503 to the clutch plate 505 and hence to the input element of the variable-speed transmission. The radially outer portion of the diaphragm spring 527 normally bears against the adjacent axially extending projections of an axially movable pressure plate 528 which is non-rotatably connected to the cover 522 by one or more leaf springs (note the leaf spring 35A in FIG. 1). The pressure plate 528 has an annular friction surface which bears against the adjacent friction lining 529 of the clutch plate 529 when the clutch 504 is engaged whereby the other friction lining 529 bears against the annular friction surface 532 of the secondary flywheel 503.

FIG. 6 shows that at least the major part of (in the illustrated embodiment the entire) toroidal portion 512 of the chamber 511 is located radially outwardly of the secondary flywheel 503. This renders it possible to position a very substantial part of main section 513 of the primary flywheel 502 and the secondary flywheel 503 into immediate or very close proximity to each other to thus greatly reduce the axial length of the torque transmitting apparatus 501. The entire secondary flywheel 503 can be accommodated in the space which is surrounded by the toroidal portion 512 of the annular chamber 511 in such a way that the friction surface 532 at the right-hand side of the secondary flywheel is located to the left of the wall 519 or at least to the left of the exposed right-hand side of the radially inwardly extending portion 519a of this wall.

The disc-shaped portion 514 of the main section 513 and the secondary flywheel 503 define a relatively narrow clearance 530 which extends radially outwardly from the protuberance 515 and all the way to the radially inner portion of the chamber 511, namely to an annular seal 536 which is interposed between the clearance 530 and the chamber 511. The feature that the secondary flywheel 503 is fully or practically fully received in the space within the annular chamber 511 renders it possible to move the entire friction clutch 504 nearer to the primary flywheel 502 in that the secondary flywheel 503 is encapsulated or confined in the cylindrical portion 523 of the cover 522 and, at the same time, extends practically all the way to the radial portion 514 of main section 513 of the primary flywheel 502.

The annular chamber 511 is at least substantially sealed from the atmosphere by the aforementioned seal 536 between the main section 513 and the cylindrical portion 523 of the cover 522 (which rotates with the secondary flywheel 503) and by an additional seal 531 which is installed between the radially innermost part of the portion 519a and the external surface of the cylindrical portion 523. It will be seen that the clearance 530 need not receive any component parts of the apparatus 501 so that this clearance can be very narrow and can be used exclusively for highly satisfactory removal of heat from the secondary flywheel 503.

Regardless of the intended use of the improved torque transmitting apparatus 501, the width of the clearance 530 is preferably selected in such a way that it is between 0.5 and 4 mm at least over 50% of its width (as measured radially of the flywheels). It has been found that a satisfactory cooling action is achieved if the width of the clearance 530 is between 1 and 2 mm. The clearance 530 receives fresh air through substantially axially parallel openings 533 in the secondary flywheel 503 radially inwardly of the friction surface 532, and such air impinges upon the disc-shaped portion 514 to flow radially outwardly toward substantially axially extending channels or openings 535 which are provided in the secondary flywheel 503 radially outwardly of the friction surface 532. One or more additional openings 534 can be provided in the disc-shaped portion 514 of the primary flywheel 502 to direct some air toward the engine. If the openings 533 are omitted, the clearance 530 receives air through the openings 534 and causes air to flow toward and into the openings 535 to be discharged into the friction clutch 504. Such air can be caused to leave the interior of the friction clutch 504 through openings or ports 538 in the cylindrical portion 523 of the cover 522. The openings 535 are or can be immediately adjacent the internal surface of cylindrical portion 523 of the cover 522.

The openings 533 and/or 534 and/or 535 and/or 538 can constitute circular openings or slots which are elongated in the circumferential direction of the flywheels 502 and 503. Furthermore, the shape of the openings 533, 534, 535 and/or 538 can be selected to resemble that of vanes or blades in a blower or another gas circulating device.

The openings 533 further serve to permit introduction of the fasteners 508 so that the shank 540a of each fastener enters the respective hole 507. The openings 533 are large enough to permit passage of the enlarged portions (heads) 540 of the fasteners 508.

The seal 536 is nearer to the common axis of the flywheels 502, 503 than the seal 531. The seal 536 can constitute or include a membrane or a diaphragm spring which reacts against the internal surface of the disc-shaped portion 514 and bears against a shoulder 537 on the free end 523a of cylindrical portion 523 of the cover 522. The locus of engagement between the seal 536 and the disc-shaped portion is disposed radially outwardly of median portion of the friction surface 532, i.e., nearer to the radially outermost portion than to the radially innermost portion of the surface 532. A shoulder 537 serves to center the seal 536 between the primary flywheel 502 and the cylindrical portion 523 of the cover 522 at the general radial level of the openings 535 in the secondary flywheel 503.

The seal 531 is a ring which is made of rubber or an elastomeric plastic material. However, this seal can be replaced with a membrane or with a diaphragm spring without departing from the spirit of the invention. The seal 531 is recessed into a groove of the radially inwardly extending portion 519a of the wall 519 and is in requisite frictional engagement with the adjacent preferably smooth and preferably cylindrical external surface of the cylindrical portion 523.

The illustrated positions of the seals 531, 536 render it possible to shorten the apparatus 501 in the axial direction of the flywheels 502 and 503. Moreover, the positioning of the seal 536 at the radial level of the openings 535 radially outwardly of the friction surface 532 renders it possible to provide a large clearance 530 which, in turn, facilitates effective cooling of the flywheel 503 and of adjacent parts including the contents of the chamber 511. The seal 536 is cooled by air which flows from the clearance 530 into the channels 535, and the cylindrical portion 523 and the seal 531 are cooled by air which flows from the clearance 530 into the interior of the friction clutch 504 because the openings 535 are immediately adjacent the internal surface of the cylindrical portion 523.

The flywheels 502, 503 and the friction clutch 504 (with its clutch plate 505) are assembled into a unit A which can be readily manipulated on its way to storage, to an automobile assembling plant, to a repair shop and also during actual installation of the primary flywheel 502 on the rotary output element of an engine in a motor vehicle. The first step of assembling the unit A involves connection of the friction clutch 504 with the secondary flywheel 503 in such a way that the two friction linings 529 of the clutch plate 505 are located between the friction surface 532 of the secondary flywheel and the friction surface of the pressure plate 528. The thus obtained subassembly 503+504−505 is then placed next to the primary flywheel 502 minus the wall 519 which is placed next to the toroidal portion 518 subsequent to introduction of the arms 521 into the toroidal portion 512 of the annular chamber 511 so that each arm 521 is located between the adjacent end convolutions of two neighboring energy storing elements 510. The wall 519 and the toroidal portion 518 of the primary flywheel 502 are thereupon permanently or more or less permanently connected to each other by the welded joint 520. The energy storing elements 510 are located in the respective compartments of the toroidal portion 512 prior to making of the welded joint 520. The seal 531 is put into the groove of the radially extending portion 519a of the wall 519 before the latter is welded to the main section 513 of the primary flywheel 502, and the seal 536 is also in place to undergo the required stressing in response to introduction of the secondary flywheel 503 into the space within the toroidal portion 512 of the chamber 511 so that the disc-shaped portion 514 and the flywheel 503 define the clearance 530 preferably having a width of between 0.5 and 4 mm.

The bearing 506 also forms part of the pre-assembled unit A; such bearing is mounted on the end portion 515a of the protuberance 515 and is surrounded by the flywheel 503 as well as by the fasteners 508, the shanks 540a of which already extend into (but not outwardly beyond) the respective holes 507. The holes 507 preferably contain elastically deformable sleeves 507a which can be frictionally engaged by the shanks 540a of the respective fasteners 508 in such axial positions that the tips of the externally threaded shanks 540a do not project beyond the exposed left-hand side 542 of the disc-shaped portion 514, i.e., the tips of the fasteners 508 cannot interfere with positioning of the primary flywheel 502 next to the rotary output element of an engine.

The openings 533 of the secondary flywheel 503 are in at least partial alignment with the adjacent openings 543 in the flange 541 of the clutch plate 505. This renders it possible to introduce the working end of a rotary tool (e.g., an allen wrench, not shown) into the polygonal (normally hexagonal) sockets in the heads 540 of the fasteners 508. The fasteners 508 cannot be lost or misplaced because the openings 543 in the flange 541 of the clutch plate 505 are configurated and/or dimensioned in such a way that they are too small for the heads 540, i.e., the fasteners 508 are confined in the preassembled unit A and can remain in proper positions for driving the respective shanks 540a into the registering tapped bores or holes of the output element of the engine when the unit A is properly oriented relative to and is placed sufficiently close to the output element.

When the shank 540a of a fastener 508 is to be driven into the output element of the engine, the working end of an allen wrench or another suitable torque transmitting tool is introduced first through a selected opening 544 in the prong 527a or between two neighboring prongs 527a of the diaphragm spring 527, thereupon through the respective opening 543 of the flange 541 of the clutch plate 505, and thereafter into the socket of the head 540 of the respective fastener 508. Axial stressing of the head 540 by the torque transmitting tool suffices to move the respective shank 540a axially in the corresponding hole 507 (against the opposition of yieldable sleeve 507a which tends to prevent the tip of the shank 540a from advancing beyond the exposed side 542 of the disc-shaped portion 541) and into the registering tapped bore of the output element of the engine. Each yieldable sleeve 507a can be made of a ductile or elastically deformable plastic material which can be properly engaged by the shank 540a of the respective fastener 508. The sleeve 507a yields radially outwardly in response to introduction of the tip of a shank 540a into the respective hole 507 but thereupon holds the shank in a desired axial position until the operator decides to drive the respective shank 540a into a tapped bore of the output element. A relatively small axially oriented force (applied by the working end of the torque transmitting tool, such as the aforementioned allen wrench) should suffice to set the shank 540a into axial motion against the opposition of the sleeve 507a.

The unit A contains the clutch plate 505 in an accurately centered position between the secondary flywheel 503 and the pressure plate 528 of the friction clutch 504. This saves much time during installation of the primary flywheel 502 on the output element of the engine because the operator or a robot not resort to a centering mandrel which is needed to install a conventional torque transmitting apparatus wherein the flywheels, the friction clutch and certain other parts are not assembled into a self-supporting unit which further includes a requisite number of fasteners for connecting the primary flywheel to the engine. The orientation of the centered clutch plate 505 in the unit A is such that the openings 543 in its flange 541 are in at least partial alignment with the openings 533 of the secondary flywheel 503 in order to permit introduction of the torque transmitting tool into engagement with the head 540 of a selected fastener 508. In the apparatus 501 of FIG. 6, the openings 543 are too small to permit passage of a head 540, i.e., the fastener 508 is captive between the disc-shaped portion 514 and the flange 541. Therefore the openings 544 in or between the prongs 527a of the diaphragm spring 527 can be larger or much larger than necessary for the passage of a screw head 540. The provision of large or very large openings 544 ensures adequate alignment of such openings with the adjacent openings 543 for convenient introduction of the working end of a torque transmitting tool. As already described with reference to FIG. 1, and as shown in the aforementioned U.S. Pat. No. 4,747,586 to Wolfgang Reik, the openings 544 can constitute enlarged portions of slots between neighboring prongs 527a of the diaphragm spring 527.

It is often necessary or advisable to resort to an unequal distribution of holes 507 in the circumferential direction of the bearing 506 in order to ensure that the primary flywheel 502 can be connected to the output element of an engine in a single predetermined angular position. This necessitates appropriate unequal distribution of the openings 533, 543, 544 or the provision of openings 533, 543 and 544 which are equidistant from each other in the circumferential direction of the flywheel 503, flange 541 and diaphragm spring 527 but must be sufficiently large to still enable the working end of a torque transmitting tool to pass first through an opening 544, thereupon through the at least partially aligned opening 543 and thereafter into the socket in the head 540 of the corresponding captive fastener 508 in order to advance the engaged heads 540 through the openings 533 and to thus dislodge the shank 540a relative to the sleeve 507a in order to drive the shank 540a into the aligned tapped bore or hole in the output element of the engine.

In the illustrated torque transmitting apparatus 501, the openings 544 in or between the prongs 527a of the diaphragm spring 527 are dimensioned and/or configurated in such a way that they are too small for the heads 540 of fasteners 508.

As mentioned above, assembly of the flywheels 502, 503, of the friction clutch 504 and its clutch plate 505, of the bearing 506 and of the fasteners 508 into a unit A contributes significantly to convenience of handling of such unit in storage, during transport as well as during attachment to the output element of an engine. Thus, centering of the clutch plate 505 can be carried out in the plant wherein the unit A is assembled, the same as attachment of the clutch 504 and secondary flywheel 503 to each other, the centering mandrel which is needed for installation of conventional torque transmitting apparatus between an engine and a transmission can be dispensed with, and the fasteners 508 are located in optimum positions for introduction of their shanks 540a into the tapped bores of the output element as soon as the unit A is properly positioned relative to the engine.

The apparatus 501 also comprises a liner 540 which shields the parts 518, 519 of the primary flywheel 502 from wear and is directly contacted by the radially outer portions of energy storing elements 510 when such elements tend to move radially outwardly under the action of centrifugal force while the flywheel 502 receives torque from the engine.

The improved torque transmitting apparatus is susceptible of numerous additional modifications. For example, the wear resistant liner 40 or a similar liner can be used in each of the apparatus which are shown in FIGS. 2 to 6. Furthermore, the features of the apparatus of FIGS. 1-1a can be combined with those of the apparatus of FIG. 2, the feature of the apparatus of FIGS. 1-1a or FIG. 2 can be combined with those of the apparatus which is shown in FIG. 3, and so forth. Still further the holes which are provided in the primary flywheel for the fasteners 38 can be located radially outwardly of the bearing. An advantage of such design is that the apparatus can employ a smaller and hence less expensive antifriction ball, roller, needle or other antifriction bearing with one or more rows of rolling elements.

The secondary flywheel can extend radially inwardly so that it overlies the holes (such as 5) in the primary flywheel). The secondary flywheel is then provided with openings which register with the holes 5 to afford access to the heads 38b of the screws 38 and to permit the screws 38 to pass therethrough.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the afore-described contribution to the art and, therefore, such adaptations should and are intended to be comprehended within the meaning and range of equivalence of the appended claims.

What is claimed is:

1. Apparatus for transmitting torque in a motor vehicle, comprising a first rotary flywheel connectable with an engine of a vehicle; a second rotary flywheel connectable with a transmission of the vehicle by a clutch, each of said flywheels having a circumference; at least one antifriction bearing between said flywheels; at least one damper operative to oppose rotation of said flywheels relative to each other and disposed in an at least partly sealed annular chamber which is defined at least in part by at least one of said flywheels, said at least one damper having energy storing elements acting circumferentially of said flywheels and said clutch having a clutch plate adjacent an annular friction surface of one of said flywheels, said friction surface having a radially innermost portion and a radially outermost portion and said chamber having a radially inner portion extending radialy inwardly at most halfway between said innermost and outermost portions; and means for fastening said first flywheel to a rotary output element of the engine, said first flywheel having holes for said fastening means and said holes being located radially outwardly of said at least one bearing, said fastening means comprising discrete fasteners which are arranged to pass through said holes and to engage the output element of the engine, said second flywheel having openings in at least partial alignment with said holes to permit passage of a tool which is used to engage said fasteners with the output element of the engine.

2. The apparatus of claim 1, wherein said flywheels are rotatable about a predetermined axis and said clutch plate has openings for the tool, said openings of said clutch plate being at least substantially parallel to said axis.

3. The apparatus of claim 2, wherein said fasteners have heads and said openings of said clutch plate are dimensioned to permit the heads of said fasteners to pass therethrough.

4. The apparatus of claim 2, wherein said fasteners have heads and said openings of said clutch plate are dimensioned to prevent the heads of said fasteners from passing therethrough.

5. The apparatus of claim 1, wherein said flywheels are rotatable about a predetermined axis and said clutch further includes a diaphragm spring having openings for the tool, said openings of said diaphragm spring being substantially parallel to said axis.

6. The apparatus of claim 5, wherein said fasteners have heads and said openings of said diaphragm spring are dimensioned to permit the heads of said fasteners to pass therethrough.

7. The apparatus of claim 5, wherein said openings of said diaphragm spring are dimensioned to with minimal clearance permit the passage of the tool therethrough.

8. Apparatus for transmitting torque in a motor vehicle, comprising a first rotary flywheel connectable with an engine of a vehicle; a second rotary flywheel connectable with a transmission of the vehicle by a clutch, each of said flywheels having a circumference; at least one antifriction bearing between said flywheels; at least one damper operative to oppose rotation of said flywheels relative to each other and disposed in an at least partly sealed annular chamber which is defined at least in part by at least one of said flywheels, said at least one damper having energy storing elements acting in the circumferential direction of said flywheels and said clutch having a clutch plate adjacent an annular friction surface on one of said flywheels, said friction surface having a radially innermost portion and a radially outermost portion and said chamber having a radially inner portion extending radially inwardly at most halfway between said innermost and outermost portions; and means for transmitting torque between said flywheels, including torque transmitting elements extending into said chamber and being integral with a radially outer portion of the flywheel other than the flywheel defining said chamber.

9. The apparatus of claim 8, wherein said torque transmitting elements are radially outwardly extending cast projections alternating with the energy storing elements in said chamber.

10. Apparatus for transmitting torque in a motor vehicle, comprising a first rotary flywheel connectable with an engine of the vehicle; a second rotary flywheel coaxial with and rotatable relative to said first flywheel and connectable with a transmission of the vehicle; at least one damper provided in an annular chamber defined by an annular portion of one of said flywheels, the other of said flywheels having a radially outer portion, said flywheels having confronting portions disposed radially inwardly of said chamber and defining a clearance; and means for transmitting torque between said flywheels, including torque transmitting elements integral with the radially outer portion of said other of said flywheels and extending into said chamber.

11. Apparatus for transmitting torque in a motor vehicle, comprising a first rotary flywheel connectable with an engine of the vehicle; a second rotary flywheel coaxial with and rotatable relative to said first flywheel, said second flywheel being connectable with a transmission of the vehicle and having a friction surface for a clutch plate; at least one damper provided in an annular chamber defined by an annular portion of one of said flywheels, the other of said flywheels having a radially outer portion; and means for transmitting torque between said flywheels, including torque transmitting elements integral with the radially outer portion of said other of said flywheels and extending into said chamber.

12. The apparatus of claim 11, wherein said torque transmitting elements are located radially outwardly of said friction surface.

* * * * *